US010852514B2

(12) United States Patent
Wang et al.

(10) Patent No.: US 10,852,514 B2
(45) Date of Patent: Dec. 1, 2020

(54) PHOTOGRAPHING OPTICAL SYSTEM, IMAGE CAPTURING UNIT AND ELECTRONIC DEVICE

(71) Applicant: LARGAN PRECISION CO., LTD., Taichung (TW)

(72) Inventors: Kuo-Jui Wang, Taichung (TW); Yu-Tai Tseng, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 125 days.

(21) Appl. No.: 16/183,217

(22) Filed: Nov. 7, 2018

(65) Prior Publication Data

US 2020/0096733 A1   Mar. 26, 2020

(30) Foreign Application Priority Data

Sep. 26, 2018   (TW) .............. 107133883 A

(51) Int. Cl.
*G02B 13/00*   (2006.01)
*G02B 9/60*   (2006.01)

(52) U.S. Cl.
CPC ........... *G02B 13/0045* (2013.01); *G02B 9/60* (2013.01)

(58) Field of Classification Search
CPC ............... G02B 12/001; G02B 12/002; G02B 12/0045; G02B 9/00; G02B 9/60; H04N 5/372; H04N 5/374
USPC ................. 359/714, 708, 763, 764
See application file for complete search history.

(56) References Cited

U.S. PATENT DOCUMENTS

| | | | |
|---|---|---|---|
| 6,034,824 A | 3/2000 | Moon | |
| 8,179,618 B2 | 5/2012 | Baba | |
| 8,400,716 B2 | 3/2013 | Jeong | |
| 8,705,182 B1 | 4/2014 | Chen et al. | |
| 9,151,931 B1 | 10/2015 | Chen | |
| 2012/0075721 A1 | 3/2012 | Konishi et al. | |
| 2012/0314296 A1 | 12/2012 | Shabtay et al. | |
| 2013/0010181 A1 | 1/2013 | Baba | |
| 2013/0088635 A1 | 4/2013 | Sano | |
| 2013/0100545 A1 | 4/2013 | Jo | |
| 2013/0229567 A1 | 9/2013 | Sano | |
| 2014/0293448 A1 | 10/2014 | Kanda et al. | |
| 2015/0077863 A1 | 3/2015 | Shinohara et al. | |
| 2015/0177495 A1* | 6/2015 | Kanda ................ | G02B 13/0045 359/764 |

(Continued)

FOREIGN PATENT DOCUMENTS

| | | |
|---|---|---|
| CN | 108802973 A | 11/2016 |
| CN | 205750079 U | 11/2016 |

(Continued)

*Primary Examiner* — Marin Pichler
(74) *Attorney, Agent, or Firm* — Maschoff Brennan

(57) ABSTRACT

A photographing optical system includes five lens elements which are, in order from an object side to an image side: a first lens element, a second lens element, a third lens element, a fourth lens element and a fifth lens element. Each of the five lens elements has an object-side surface facing toward the object side and an image-side surface facing toward the image side. The second lens element has negative refractive power. The fifth lens element has negative refractive power. At least one of the five lens elements has at least one aspheric surface having at least one inflection point.

27 Claims, 28 Drawing Sheets

(56) References Cited

U.S. PATENT DOCUMENTS

| | | |
|---|---|---|
| 2016/0004034 A1 | 1/2016 | Nishihata et al. |
| 2016/0195695 A1 | 7/2016 | Tang et al. |
| 2016/0195699 A1 | 7/2016 | Tang et al. |
| 2016/0259148 A1 | 9/2016 | Tang et al. |
| 2016/0259149 A1 | 9/2016 | Tang et al. |
| 2016/0266349 A1 | 9/2016 | Tang et al. |
| 2016/0266352 A1 | 9/2016 | Tang et al. |
| 2017/0199360 A1 | 7/2017 | Chang |
| 2017/0269330 A1 | 9/2017 | Jhang et al. |
| 2019/0187414 A1 | 6/2019 | Zhang |

FOREIGN PATENT DOCUMENTS

| | | |
|---|---|---|
| CN | 107656358 A | 2/2018 |
| CN | 107957620 A | 4/2018 |
| CN | 108107549 A | 6/2018 |
| JP | 2011-133600 A | 7/2011 |
| JP | 2013-156457 A | 8/2013 |
| JP | 2014-123034 A | 7/2014 |
| JP | 2014-123092 A | 7/2014 |
| JP | 2015-225246 A | 12/2015 |
| TW | M438644 U | 10/2012 |
| WO | 2014/080382 A1 | 5/2014 |
| WO | 2018126587 A1 | 7/2018 |

* cited by examiner

PHOTOGRAPHING OPTICAL SYSTEM, IMAGE CAPTURING UNIT AND ELECTRONIC DEVICE

RELATED APPLICATIONS

This application claims priority to Taiwan Application 107133883, filed on Sep. 26, 2018, which is incorporated by reference herein in its entirety.

BACKGROUND

Technical Field

The present disclosure relates to a photographing optical system, an image capturing unit and an electronic device, more particularly to a photographing optical system and an image capturing unit applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays.

Furthermore, due to the rapid changes in technology, electronic devices equipped with optical systems are developed towards multi-functionality for various applications, and therefore the functionality requirements for the optical systems have been increasing. However, it is difficult for a conventional optical system to obtain a balance among the requirements such as high image quality, low sensitivity, a desirable aperture size, miniaturization or required field of view. Accordingly, the present disclosure provides an optical system that satisfies the aforementioned requirements.

SUMMARY

According to one aspect of the present disclosure, a photographing optical system includes five lens elements. The five lens elements are, in order from an object side to an image side, a first lens element, a second lens element, a third lens element, a fourth lens element and a fifth lens element. Each of the five lens elements has an object-side surface facing toward the object side and an image-side surface facing toward the image side. The second lens element has negative refractive power. The fifth lens element has negative refractive power. The image-side surface of the fifth lens element is concave in a paraxial region thereof. The image-side surface of the fifth lens element is aspheric and has at least one inflection point. When an axial distance between the image-side surface of the fifth lens element and an image surface is BL, an axial distance between the second lens element and the third lens element is T23, an axial distance between the fourth lens element and the fifth lens element is T45, a central thickness of the second lens element is CT2, a central thickness of the third lens element is CT3, an axial distance between the object-side surface of the first lens element and the image-side surface of the fifth lens element is TD, a focal length of the third lens element is f3, a focal length of the fifth lens element is f5, and an f-number of the photographing optical system is Fno, the following conditions are satisfied:

$BL/T45<1.0$;

$0<(CT2+CT3)/T23<5.8$;

$6.5<TD/BL$;

$5.2<|f3/f5|$; and $1.00<Fno<2.60$.

According to another aspect of the present disclosure, a photographing optical system includes five lens elements. The five lens elements are, in order from an object side to an image side, a first lens element, a second lens element, a third lens element, a fourth lens element and a fifth lens element. Each of the five lens elements has an object-side surface facing toward the object side and an image-side surface facing toward the image side. The second lens element has negative refractive power. The fifth lens element has negative refractive power. At least one of the five lens elements has at least one aspheric surface having at least one inflection point. When an axial distance between the image-side surface of the fifth lens element and an image surface is BL, an axial distance between the second lens element and the third lens element is T23, an axial distance between the fourth lens element and the fifth lens element is T45, a central thickness of the second lens element is CT2, a central thickness of the third lens element is CT3, an axial distance between the object-side surface of the first lens element and the image-side surface of the fifth lens element is TD, a focal length of the third lens element is f3, a focal length of the fifth lens element is f5, an f-number of the photographing optical system is Fno, a minimum value among Abbe numbers of all lens elements of the photographing optical system is Vmin, the following conditions are satisfied:

$BL/T45<1.0$;

$0.45<(CT2+CT3)/T23<5.8$;

$3.9<TD/BL$;

$3.8<|f3/f5|$;

$1.00<Fno<2.60$; and $10.0<V\min<22.0$.

According to still another aspect of the present disclosure, an image capturing unit includes the aforementioned photographing optical system and an image sensor, wherein the image sensor is disposed on the image surface of the photographing optical system.

According to yet another aspect of the present disclosure, an electronic device includes the aforementioned image capturing unit.

According to yet still another aspect of the present disclosure, a photographing optical system includes five lens elements. The five lens elements are, in order from an object side to an image side, a first lens element, a second lens element, a third lens element, a fourth lens element and a fifth lens element. Each of the five lens elements has an object-side surface facing toward the object side and an image-side surface facing toward the image side. The second lens element has negative refractive power. The fifth lens element has negative refractive power. At least one of the five lens elements has at least one aspheric surface having at least one inflection point. When an axial distance between the image-side surface of the fifth lens element and an image surface is BL, an axial distance between the second lens element and the third lens element is T23, an axial distance between the fourth lens element and the fifth lens element is T45, a central thickness of the second lens element is CT2, a central thickness of the third lens element is CT3, an axial distance between the object-side surface of the first lens element and the image-side surface of the fifth lens element is TD, a focal length of the photographing optical system is f, a focal length of the third lens element is f3, a focal length of the fifth lens element is f5, a curvature radius of the object-side surface of the fourth lens element is R7, the following conditions are satisfied:

$BL/T45<1.0;$ $0.65<(CT2+CT3)/T23<5.8;$ $7.0<TD/BL;$ $5.2<|f3/f5|;$ and $-1.80<f/R7<2.30.$

BRIEF DESCRIPTION OF THE DRAWINGS

The disclosure can be better understood by reading the following detailed description of the embodiments, with reference made to the accompanying drawings as follows.

DETAILED DESCRIPTION

A photographing optical system includes five lens elements. The five lens elements are, in order from an object side to an image side, a first lens element, a second lens element, a third lens element, a fourth lens element and a fifth lens element.

The first lens element can have positive refractive power; therefore, it is favorable for providing light converging capability and reducing the total track length of the photographing optical system. The first lens element can have an object-side surface being convex in a paraxial region thereof; therefore, it is favorable for having a proper incident angle of light rays on the first lens element so as to adjust travelling direction of light rays and to increase illuminance on the image surface.

The second lens element has negative refractive power; therefore, it is favorable for correcting aberrations due to the miniaturization of the photographing optical system, such as spherical aberration. The second lens element can have an image-side surface being concave in a paraxial region thereof; therefore, it is favorable for adjusting the shape of the second lens element so as to reduce astigmatism.

The fourth lens element can have positive refractive power; therefore, it is favorable for providing converging capability on the image side so as to reduce the size of the photographing optical system. The fourth lens element can have an image-side surface being convex in a paraxial region thereof; therefore, it is favorable for adjusting the travelling direction of light rays so as to correct off-axis aberrations and to enlarge the imaging range.

Figure 27:
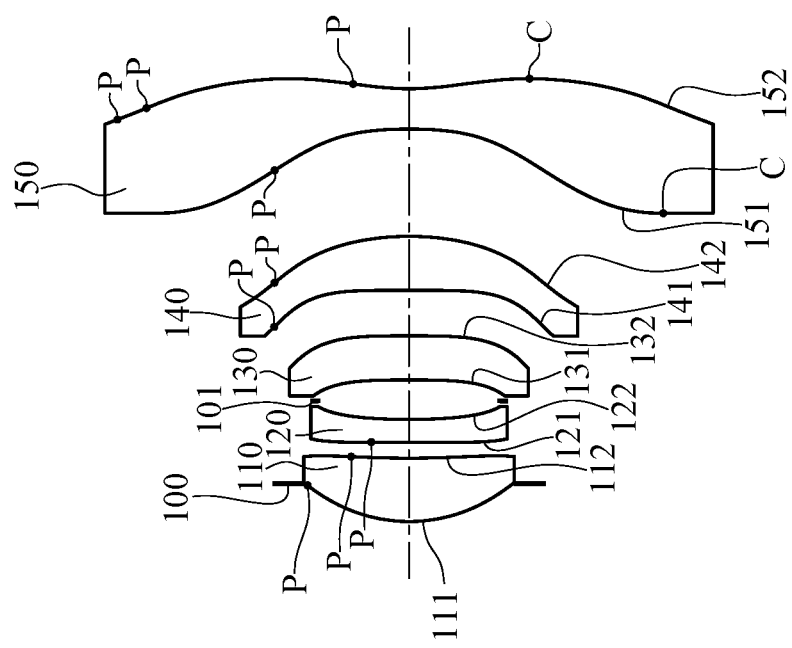
FIG. 27 shows a schematic view of inflection points of the first lens element, the second lens element, the fourth lens element and the fifth lens element and critical points of the fifth lens element according to the 1st embodiment of the present disclosure.

The fifth lens element has negative refractive power; therefore, it is favorable for balancing the refractive power on the image side and adjusting the back focal length of the photographing optical system. The fifth lens element can have an image-side surface being concave in a paraxial region thereof; therefore, it is favorable for adjusting the shape of the fifth lens element so as to correct aberrations such as distortion. Preferably, the image-side surface of the fifth lens element can have at least one critical point in an off-axis region thereof and which is favorable for correcting off-axis aberrations. Please refer to FIG. 27, which shows a schematic view of a critical point C of the image-side surface 152 of the fifth lens element 150 according to the 1st embodiment of the present disclosure.

According to the present disclosure, at least one of the five lens element of the photographing optical system has at least one aspheric surface having at least one inflection point. Therefore, it is favorable for increasing the shape variation of the lens elements so as to correct off-axis aberrations and to reduce the size of the photographing optical system. Preferably, each of at least two of the five lens elements can have at least one aspheric surface having at least one inflection point. More preferably, each of at least three of the five lens elements can have at least one aspheric surface having at least one inflection point. In addition, when an object-side surface of the fifth lens element has at least one inflection point, it is favorable for adjusting the incident angle of light rays on the fifth lens element so as to reduce surface reflection and off-axis aberrations. Preferably, the object-side surface of fifth lens element can have at least one critical point in an off-axis region thereof. Furthermore, when the image-side surface of the fifth lens element has at least one inflection point, it is favorable for reducing aberrations such as off-axis field curvature and increasing illuminance on the peripheral region of the image surface. Please refer to FIG. 27, which shows a schematic view of inflection points P of the first lens element 110, the second lens element 120, the fourth lens element 140 and the fifth lens element 150 and a critical point C of the object-side surface 151 of the fifth lens element 150 according to the 1st embodiment of the present disclosure.

When an axial distance between the image-side surface of the fifth lens element and an image surface is BL, and an axial distance between the fourth lens element and the fifth lens element is T45, the following condition is satisfied: BL/T45<1.0. Therefore, it is favorable for adjusting the distribution of the lens elements on the image side of the photographing optical system so as to obtain a proper back focal length. Preferably, the following condition can also be satisfied: 0.20<BL/T45<0.80.

When a central thickness of the second lens element is CT2, a central thickness of the third lens element is CT3, and an axial distance between the second lens element and the third lens element is T23, the following condition is satisfied: 0<(CT2+CT3)/T23<5.8. Therefore, it is favorable for the second lens element and the third lens element to cooperate with each other so as to obtain a good balance between the aberration correction and miniaturization of the photographing optical system. Preferably, the following condition can be satisfied: 0.45<(CT2+CT3)/T23<5.8. More preferably, the following condition can be satisfied: 0.65<(CT2+CT3)/T23<5.8. Much more preferably, the following condition can be satisfied: 1.0<(CT2+CT3)/T23<4.5. Still much more preferably, the following condition can also be satisfied: 1.6<(CT2+CT3)/T23<3.0.

When an axial distance between the object-side surface of the first lens element and the image-side surface of the fifth lens element is TD, and the axial distance between the image-side surface of the fifth lens element and the image surface is BL, the following condition is satisfied: 3.9<TD/BL; therefore, it is favorable for adjusting the distribution of the lens elements so as to obtain a short back focal length, thereby reducing the total track length of the photographing optical system. Preferably, the following condition can be satisfied: 5.2<TD/BL. More preferably, the following condition can be satisfied: 6.5<TD/BL. Much more preferably, the following condition can also be satisfied: 7.0<TD/BL. In one configuration, the following condition can be satisfied: TD/BL<50; therefore, it is favorable for preventing an overly large size and overly short back focal length of the photographing optical system so as to increase assembling yield rate. More preferably, the following condition can also be satisfied: TD/BL<30.

When a focal length of the third lens element is f3, and a focal length of the fifth lens element is f5, the following condition is satisfied: 3.8<|f3/f5|. Therefore, it is favorable for adjusting the distribution of the refractive power on the image side of the photographing optical system so as to obtain a good balance between a large image surface and compactness of the photographing optical system. Preferably, the following condition can be satisfied: 4.5<|f3/f5|. More preferably, the following condition can be satisfied: 5.2<|f3/f5|. Much more preferably, the following condition can also be satisfied: 6.3<|f3/f5|.

When an f-number of the photographing optical system is Fno, the following condition can be satisfied: 1.00<Fno<2.60. Therefore, it is favorable for required intensity of light to travel into the photographing optical system so as to obtain high quality images in cooperation with the image sensor. Preferably, the following condition can also be satisfied: 1.40<Fno<2.40.

When a minimum value among Abbe numbers of all lens elements of the photographing optical system is Vmin, the following condition can be satisfied: 10.0<Vmin<22.0. Therefore, a lens material having low Abbe number is favorable for correcting aberrations such as chromatic aberration. Preferably, the following condition can also be satisfied: 14.0<Vmin≤20.4.

When a focal length of the photographing optical system is f, and a curvature radius of an object-side surface of the fourth lens element is R7, the following condition can be satisfied: −1.80<f/R7. Therefore, it is favorable for adjusting the shape of the fourth lens element so as to reduce sensitivity, thereby increasing manufacturing yield rate. Preferably, the following condition can be satisfied: −1.80<f/R7<2.30. More preferably, the following condition can also be satisfied: −1.00<f/R7<1.40.

When a focal length of the first lens element is f1, a focal length of the second lens element is f2, the focal length of the third lens element is f3, a focal length of the fourth lens element is f4, and the focal length of the fifth lens element is f5, at least one of the following conditions can be satisfied: |f1/f4|<1.0; |f2/f3|<1.0; |f4/f2|<1.0; and |f5/f1|<1.0. When at least one of the above conditions is satisfied, it is favorable for adjusting the refractive power distribution of the photographing optical system so as to optimize the field of view and to reduce the size of the photographing optical system.

When the focal length of the photographing optical system is f, a curvature radius of an object-side surface of the third lens element is R5, and a curvature radius of an image-side surface of the third lens element is R6, the following condition can be satisfied: f/|R5|+f/|R6|<0.80. Therefore, it is favorable for adjusting the shape of the third lens element so as to balance the size of the photographing optical system on the object side and the image side.

When the axial distance between the object-side surface of the first lens element and the image-side surface of the fifth lens element is TD, the following condition can be satisfied: 1.0 [mm]<TD<7.0 [mm]. Therefore, it is favorable for the photographing optical system to have a proper size so as to be applicable to various applications.

When an axial distance between the object-side surface of the first lens element and the image surface is TL, and a maximum image height of the photographing optical system (half of a diagonal length of an effective photosensitive area of an image sensor) is ImgH, the following condition can be satisfied: 0.50<TL/ImgH<3.00. Therefore, it is favorable for obtaining a good balance between a short total track length and a large image surface. Preferably, the following condition can also be satisfied: 0.80<TL/ImgH<1.50.

When half of a maximum field of view of the photographing optical system is HFOV, the following condition can be satisfied: 30.0 [deg.]<HFOV<50.0 [deg.]. Therefore, it is favorable for the photographing optical system to have a proper field of view so as to prevent an improper depth of field and an overly large distortion. Preferably, the following condition can also be satisfied: 35.0 [deg.]<HFOV<45.0 [deg.].

Figure 28:
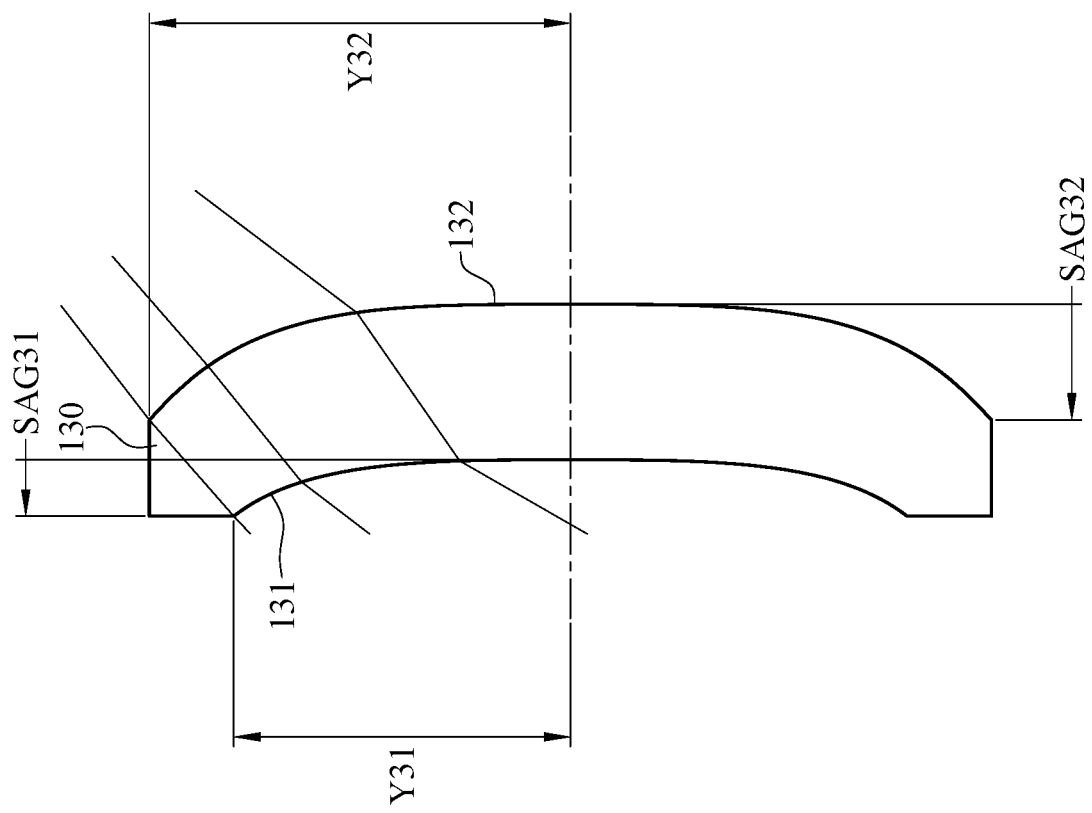
FIG. 28 shows a schematic view of the third lens element, Y31, Y32, SAG31 and SAG32 according to the 1st embodiment of the present disclosure.

When a maximum effective radius of the object-side surface of the third lens element is Y31, a maximum effective radius of the image-side surface of the third lens element is Y32, a displacement in parallel with an optical axis from an axial vertex of the object-side surface of the third lens element to a maximum effective radius position of the object-side surface of the third lens element is SAG31, and a displacement in parallel with the optical axis from an axial vertex of the image-side surface of the third lens element to a maximum effective radius position of the image-side surface of the third lens element is SAG32, the following condition can be satisfied: −20.0<Y31/SAG31+Y32/SAG32<−5.0. Therefore, it is favorable for adjusting the shape of the third lens element so as to adjust the incident and refraction directions of light rays, such that the photographing optical system features a proper field of view and proper size. Please refer to FIG. 28, which shows a schematic view of the third lens element, Y31, Y32, SAG31 and SAG32 according to the 1st embodiment of the present disclosure. When the direction from the axial vertex of one surface to the maximum effective radius position of the same surface is facing towards the image side of the photographing optical system, the value of displacement is positive; when the direction from the axial vertex of the surface to the maximum effective radius position of the same surface is facing towards the object side of the photographing optical system, the value of displacement is negative.

When a curvature radius of the object-side surface of the fifth lens element is R9, and a curvature radius of the image-side surface of the fifth lens element is R10, the following condition can be satisfied: (R9−R10)/(R9+R10)<0. Therefore, it is favorable for adjusting the shape of the fifth lens element so as to provide a proper incident angle of light rays on the image surface, thereby improving the response efficiency of an image sensor.

When an Abbe number of the second lens element is V2, the following condition can be satisfied: 10.0<V2<40.0. Therefore, it is favorable for the second lens element to have a required Abbe number so as to correct chromatic aberration.

When an Abbe number of the third lens element is V3, the following condition can be satisfied: 10.0<V3<40.0. Therefore, it is favorable for the third lens element to provide a contribution of chromatic aberration correction so as to reduce the sensitivity of the photographing optical system.

When the axial distance between the second lens element and the third lens element is T23, and the central thickness of the third lens element is CT3, the following condition can be satisfied: 0.45<T23/CT3<1.0. Therefore, it is favorable for the second lens element and the third lens element to cooperate with each other so as to adjust the travelling direction of light rays, thereby reducing the size the photographing optical system and adjusting the field of view. Preferably, the following condition can also be satisfied: 0.32<T23/CT3<2.2.

When a central thickness of the first lens element is CT1, and the central thickness of the second lens element is CT2, the following condition can be satisfied: 2.5<CT1/CT2<15. Therefore, it is favorable for the first lens element and the second lens element to cooperate with each other so as to correct aberrations.

When the central thickness of the third lens element is CT3, and a central thickness of the fourth lens element is CT4, the following condition can be satisfied: 0.63<CT3/CT4<1.3. Therefore, adjusting the ratio of the central thicknesses of the third lens element and the fourth lens element is favorable for them to have proper strength of refractive power.

When the axial distance between the object-side surface of the first lens element and the image surface is TL, and the focal length of the photographing optical system is f, the following condition can be satisfied: 0.90<TL/f<1.50. Therefore, it is favorable for balancing the reduction of the total track length and the adjustment of the field of view of the photographing optical system. Preferably, the following condition can also be satisfied: 1.00<TL/f<1.30.

When a maximum value among refractive indices of all lens elements of the photographing optical system is Nmax, the following condition can be satisfied: 1.65≤Nmax<1.70. Therefore, selecting proper lens materials is favorable for improving the image resolution, miniaturizing the photographing optical system and increasing the image surface area.

When the focal length of the first lens element is f1, and the focal length of the second lens element is f2, the following condition can be satisfied: −0.51≤f1/f2<−0.15. Therefore, it is favorable for the first lens element and second lens element to cooperate with each other so as to reduce aberrations caused by converging light rays.

When the focal length of the fourth lens element is f4, and the focal length of the fifth lens element is f5, the following condition can be satisfied: −3.50<f4/f5<−1.50. Therefore, it is favorable for adjusting the refractive power distribution on the image side of the photographing optical system so as to adjust the back focal length and to increase the image surface area.

When the axial distance between the fourth lens element and the fifth lens element is T45, and the central thickness of the first lens element is CT1, the following condition can be satisfied: 1.10<T45/CT1<3.30. Therefore, it is favorable for adjusting the distribution of the lens elements on the object side and the image side of the photographing optical system so as to obtain a balance between the field of view and the miniaturization. Preferably, the following condition can also be satisfied: 1.35<T45/CT1<2.00.

According to the present disclosure, the aforementioned features and conditions can be utilized in numerous combinations so as to achieve corresponding effects.

According to the present disclosure, the lens elements of the photographing optical system can be made of either glass or plastic material. When the lens elements are made of glass material, the refractive power distribution of the photographing optical system may be more flexible. The glass lens element can either be made by grinding or molding. When the lens elements are made of plastic material, the manufacturing cost can be effectively reduced. Furthermore, surfaces of each lens element can be arranged to be aspheric, which allows more control variables for eliminating aberrations thereof, the required number of the lens elements can be reduced, and the total track length of the photographing optical system can be effectively shortened. The aspheric surfaces may be formed by plastic injection molding or glass molding.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, an image surface of the photographing optical system, based on the corresponding image sensor, can be flat or curved, especially a curved surface being concave facing towards the object side of the photographing optical system.

According to the present disclosure, an image correction unit, such as a field flattener, can be optionally disposed between the lens element closest to the image side of the photographing optical system and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the photographing optical system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing optical system and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing optical system and thereby provides a wider field of view for the same.

According to the present disclosure, the photographing optical system can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
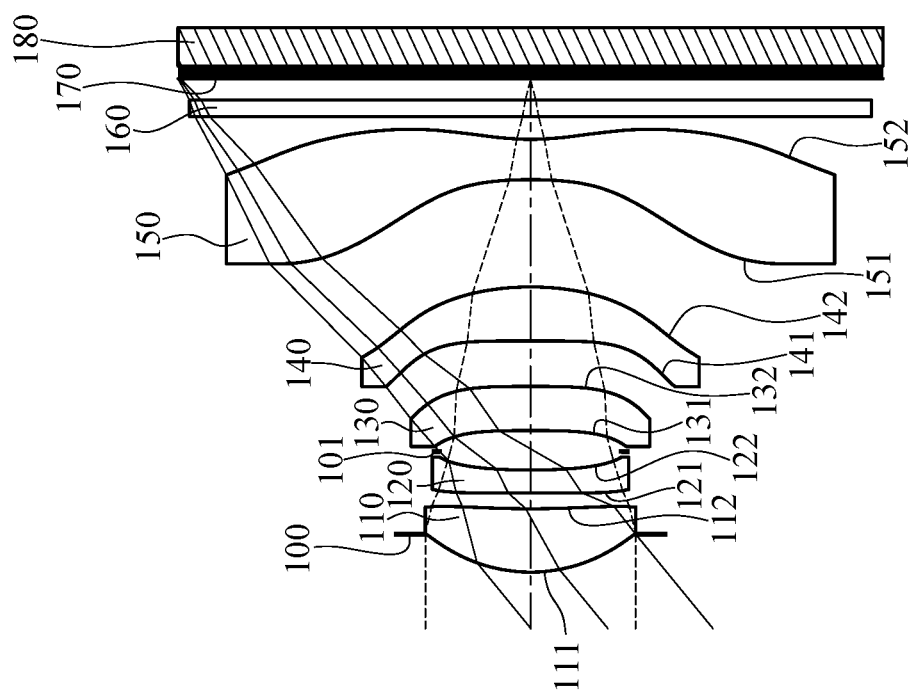
FIG. 1 is a schematic view of an image capturing unit according to the 1st embodiment of the present disclosure.
Figure 2:
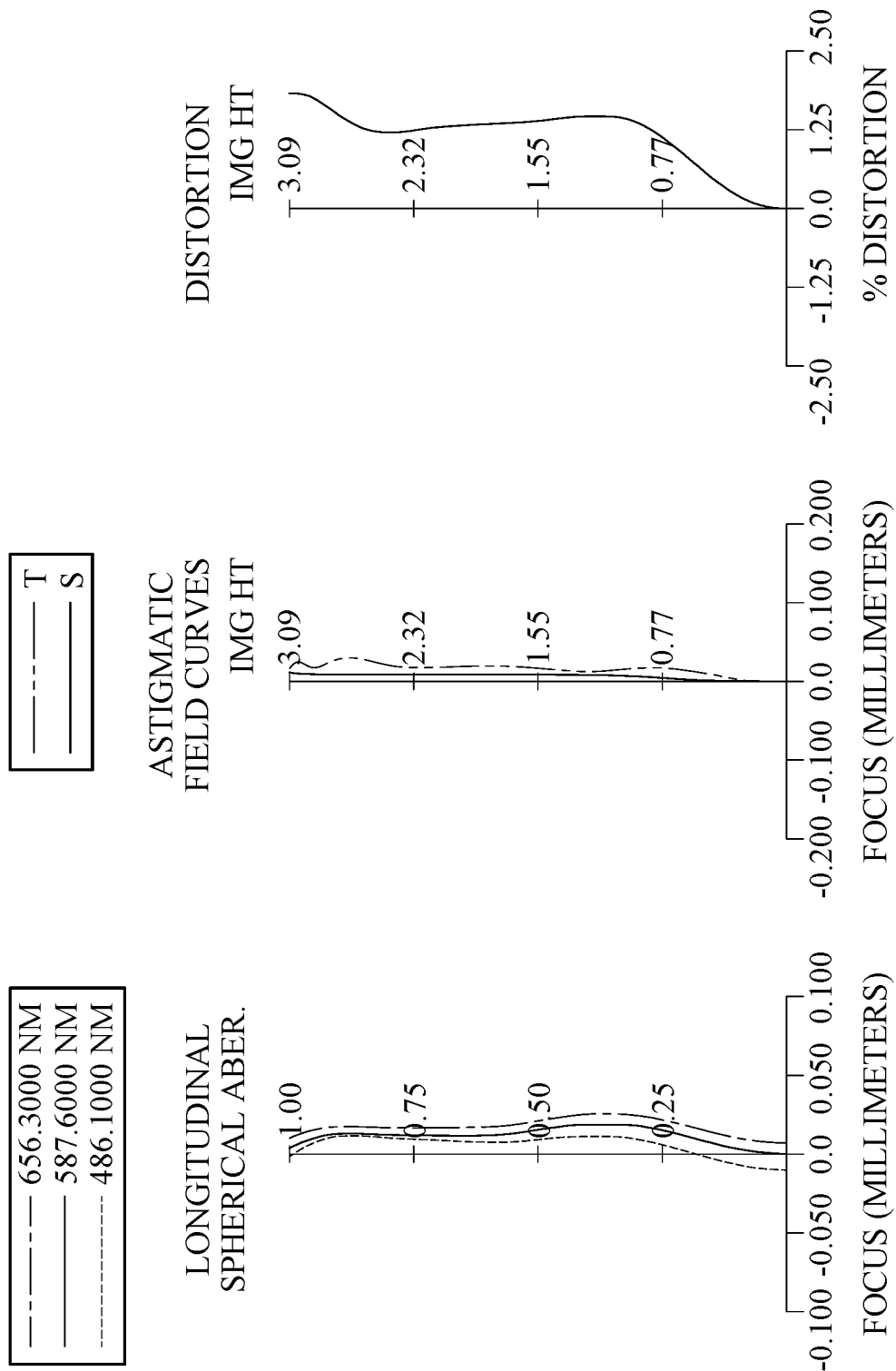
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical system (its reference numeral is omitted) of the present disclosure and an image sensor 180. The photographing optical system includes, in order from an object side to an image side, an aperture stop 100, a first lens element 110, a second lens element 120, a stop 101, a third lens element 130, a fourth lens element 140, a fifth lens element 150, a filter 160 and an image surface 170. The photographing optical system includes five lens elements (110, 120, 130, 140 and 150) with no additional lens element disposed between each of the adjacent five lens elements.

The first lens element 110 with positive refractive power has an object-side surface 111 being convex in a paraxial region thereof and an image-side surface 112 being concave in a paraxial region thereof. The first lens element 110 is made of glass material and has the object-side surface 111 and the image-side surface 112 being both aspheric. The object-side surface 111 of the first lens element 110 has one inflection point. The image-side surface 112 of the first lens element 110 has one inflection point.

The second lens element 120 with negative refractive power has an object-side surface 121 being planar in a paraxial region thereof and an image-side surface 122 being concave in a paraxial region thereof. The second lens element 120 is made of plastic material and has the object-side surface 121 and the image-side surface 122 being both aspheric. The object-side surface 121 of the second lens element 120 has one inflection point.

The third lens element 130 with negative refractive power has an object-side surface 131 being concave in a paraxial region thereof and an image-side surface 132 being convex in a paraxial region thereof. The third lens element 130 is made of plastic material and has the object-side surface 131 and the image-side surface 132 being both aspheric.

The fourth lens element 140 with positive refractive power has an object-side surface 141 being planar in a paraxial region thereof and an image-side surface 142 being convex in a paraxial region thereof. The fourth lens element 140 is made of plastic material and has the object-side surface 141 and the image-side surface 142 being both aspheric. The object-side surface 141 of the fourth lens element 140 has one inflection point. The image-side surface 142 of the fourth lens element 140 has one inflection point.

The fifth lens element 150 with negative refractive power has an object-side surface 151 being concave in a paraxial region thereof and an image-side surface 152 being concave in a paraxial region thereof. The fifth lens element 150 is made of plastic material and has the object-side surface 151 and the image-side surface 152 being both aspheric. The object-side surface 151 of the fifth lens element 150 has one inflection point. The image-side surface 152 of the fifth lens element 150 has three inflection points. The object-side surface 151 of the fifth lens element 150 has one critical point in an off-axis region thereof. The image-side surface 152 of the fifth lens element 150 has one critical point in an off-axis region thereof.

The filter 160 is made of glass material and located between the fifth lens element 150 and the image surface 170, and will not affect the focal length of the photographing optical system. The image sensor 180 is disposed on or near the image surface 170 of the photographing optical system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the photographing optical system of the image capturing unit according to the 1st embodiment, when a focal length of the photographing optical system is f, an f-number of the photographing optical system is Fno, and half of a maximum field of view of the photographing optical system is HFOV, these parameters have the following values: f=3.70 millimeters (mm), Fno=2.00, HFOV=39.3 degrees (deg.).

When a maximum value among refractive indices of all lens elements of the photographing optical system is Nmax, the following condition is satisfied: Nmax=1.66. In this embodiment, Nmax is equal to the refractive index of the second lens element 120.

When an Abbe number of the second lens element 120 is V2, the following condition is satisfied: V2=20.4.

When an Abbe number of the third lens element 130 is V3, the following condition is satisfied: V3=46.0.

When a minimum value among Abbe numbers of all lens elements of the photographing optical system is Vmin, the following condition is satisfied: Vmin=20.4. In this embodiment, Vmin is equal to the Abbe number of the second lens element 120.

When an axial distance between the image-side surface 152 of the fifth lens element 150 and the image surface 170 is BL, and an axial distance between the fourth lens element 140 and the fifth lens element 150 is T45, the following condition is satisfied: BL/T45=0.57. In this embodiment, an axial distance between two adjacent lens elements is an air gap in a paraxial region between the two adjacent lens elements.

When a central thickness of the first lens element 110 is CT1, and a central thickness of the second lens element 120 is CT2, the following condition is satisfied: CT1/CT2=2.80.

When the central thickness of the second lens element 120 is CT2, a central thickness of the third lens element 130 is CT3, and an axial distance between the second lens element 120 and the third lens element 130 is T23, the following condition is satisfied: (CT2+CT3)/T23=1.69.

When the central thickness of the third lens element 130 is CT3, and a central thickness of the fourth lens element 140 is CT4, the following condition is satisfied: CT3/CT4=0.82.

When the axial distance between the second lens element 120 and the third lens element 130 is T23, and the central thickness of the third lens element 130 is CT3, the following condition is satisfied: T23/CT3=0.90.

When the axial distance between the fourth lens element 140 and the fifth lens element 150 is T45, and the central thickness of the first lens element 110 is CT1, the following condition is satisfied: T45/CT1=1.69.

When an axial distance between the object-side surface 111 of the first lens element 110 and the image-side surface 152 of the fifth lens element 150 is TD, the following condition is satisfied: TD=3.82 [mm].

When the axial distance between the object-side surface 111 of the first lens element 110 and the image-side surface 152 of the fifth lens element 150 is TD, and the axial distance between the image-side surface 152 of the fifth lens element 150 and the image surface 170 is BL, the following condition is satisfied: TD/BL=7.14.

When an axial distance between the object-side surface 111 of the first lens element 110 and the image surface 170 is TL, and the focal length of the photographing optical system is f, the following condition is satisfied: TL/f=1.17.

When the axial distance between the object-side surface 111 of the first lens element 110 and the image surface 170 is TL, and a maximum image height of the photographing optical system is ImgH, the following condition is satisfied: TL/ImgH=1.41.

When a curvature radius of the object-side surface 151 of the fifth lens element 150 is R9, and a curvature radius of the image-side surface 152 of the fifth lens element 150 is R10, the following condition is satisfied: (R9−R10)/(R9+R10)=3.63.

When the focal length of the photographing optical system is f, a curvature radius of the object-side surface 131 of the third lens element 130 is R5, and a curvature radius of the image-side surface 132 of the third lens element 130 is R6, the following condition is satisfied: f/|R5|+f/|R6|=0.30.

When the focal length of the photographing optical system is f, and a curvature radius of the object-side surface 141 of the fourth lens element 140 is R7, the following condition is satisfied: f/R7=0.00.

When a focal length of the first lens element 110 is f1, and a focal length of the second lens element 120 is f2, the following condition is satisfied: f1/f2=−0.40.

When the focal length of the first lens element 110 is f1, and a focal length of the fourth lens element 140 is f4, the following condition is satisfied: |f1/f4|=0.74.

When the focal length of the second lens element 120 is f2, and a focal length of the third lens element 130 is f3, the following condition is satisfied: |f2/f3|=0.09.

When the focal length of the third lens element 130 is f3, and a focal length of the fifth lens element 150 is f5, the following condition is satisfied: |f3/f5|=33.24. When the focal length of the second lens element 120 is f2, and the focal length of the fourth lens element 140 is f4, the following condition is satisfied: |f4/f2|=0.54.

When the focal length of the fourth lens element 140 is f4, and the focal length of the fifth lens element 150 is f5, the following condition is satisfied: f4/f5=−1.65.

When the focal length of the first lens element 110 is f1, and the focal length of the fifth lens element 150 is f5, the following condition is satisfied: |f5/f1|=0.82.

When a maximum effective radius of the object-side surface 131 of the third lens element 130 is Y31, a maximum effective radius of the image-side surface 132 of the third lens element 130 is Y32, a displacement in parallel with the optical axis from an axial vertex of the object-side surface 131 of the third lens element 130 to a maximum effective radius position of the object-side surface 131 of the third lens element 130 is SAG31, and a displacement in parallel with the optical axis from an axial vertex of the image-side surface 132 of the third lens element 130 to a maximum effective radius position of the image-side surface 132 of the third lens element 130 is SAG32, the following condition is satisfied: Y31/SAG31+Y32/SAG32=−9.58.

The detailed optical data of the 1st embodiment are shown in Table 1 and the aspheric surface data are shown in Table 2 below.

TABLE 1

1st Embodiment
f = 3.70 mm, Fno = 2.00, HFOV = 39.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.335 | | | | |
| 2 | Lens 1 | 1.390 (ASP) | 0.559 | Glass | 1.518 | 63.5 | 3.16 |
| 3 | | 7.996 (ASP) | 0.141 | | | | |
| 4 | Lens 2 | ∞ (ASP) | 0.200 | Plastic | 1.660 | 20.4 | −7.97 |
| 5 | | 5.259 (ASP) | 0.163 | | | | |
| 6 | Stop | Plano | 0.186 | | | | |
| 7 | Lens 3 | −19.714 (ASP) | 0.389 | Plastic | 1.568 | 46.0 | −86.29 |
| 8 | | −33.214 (ASP) | 0.401 | | | | |
| 9 | Lens 4 | ∞ (ASP) | 0.476 | Plastic | 1.556 | 57.5 | 4.29 |
| 10 | | −2.388 (ASP) | 0.946 | | | | |
| 11 | Lens 5 | −4.064 (ASP) | 0.356 | Plastic | 1.556 | 57.5 | −2.60 |
| 12 | | 2.308 (ASP) | 0.200 | | | | |
| 13 | Filter | Plano | 0.145 | Glass | 1.517 | 64.2 | — |
| 14 | | Plano | 0.190 | | | | |
| 15 | Image | Plano | — | | | | |

Note:
Reference wavelength is 587.6 nm (d-line).
An effective radius of the stop 101 (Surface 6) is 0.800 mm.

TABLE 2

Aspheric Coefficients

| Surface # | | | | |
|---|---|---|---|---|
| 2 | 3 | 4 | 5 | 7 |

| | 2 | 3 | 4 | 5 | 7 |
|---|---|---|---|---|---|
| k = | −7.3331E−01 | 2.4442E+01 | 0.0000E+00 | 3.0717E+01 | −9.9000E+01 |
| A4 = | 3.1670E−02 | −5.9185E−02 | −6.1589E−02 | −2.8947E−02 | −2.3454E−01 |
| A6 = | 1.5558E−02 | −1.1340E−02 | 2.5396E−01 | 1.9202E−01 | 1.4663E−01 |
| A8 = | 2.4855E−02 | 2.1578E−01 | −1.2795E−01 | 1.7314E−01 | −4.1852E−01 |
| A10 = | −1.3695E−01 | −5.4983E−01 | −2.0899E−01 | −8.7599E−01 | 6.1467E−01 |
| A12 = | 2.0870E−01 | 5.5714E−01 | 3.9941E−01 | 1.1527E+00 | −6.5168E−01 |
| A14 = | −1.2902E−01 | −2.3746E−01 | −1.8011E−01 | −4.7470E−01 | 2.1733E−01 |

| | Surface # | | | | |
|---|---|---|---|---|---|
| | 8 | 9 | 10 | 11 | 12 |
| k = | −4.8081E+01 | 0.0000E+00 | −8.1664E+00 | −3.3195E+00 | −1.2596E+01 |
| A4 = | −2.0281E−01 | −9.3480E−02 | −9.3615E−02 | −2.2778E−01 | −1.0111E−01 |
| A6 = | −5.6855E−02 | −1.2294E−01 | 1.1489E−02 | 1.0118E−01 | 4.1261E−02 |
| A8 = | 3.9775E−01 | 2.3077E−01 | −1.1111E−01 | 1.3226E−02 | −9.3340E−03 |
| A10 = | −1.0916E+00 | −4.8937E−01 | 2.6351E−01 | −2.6243E−02 | 7.6097E−04 |
| A12 = | 1.4799E+00 | 6.5216E−01 | −3.4807E−01 | 1.0805E−02 | 2.1307E−04 |
| A14 = | −1.0515E+00 | −5.5952E−01 | 2.6795E−01 | −2.3536E−03 | −8.9554E−05 |

TABLE 2-continued

| Aspheric Coefficients | | | | | |
|---|---|---|---|---|---|
| A16 = | 3.0552E−01 | 3.0542E−01 | −1.1315E−01 | 2.9513E−04 | 1.5231E−05 |
| A18 = | — | −9.1719E−02 | 2.4122E−02 | −2.0132E−05 | −1.2810E−06 |
| A20 = | — | 1.1170E−02 | −2.0184E−03 | 5.8049E−07 | 4.2806E−08 |

In Table 1, the curvature radius, the thickness and the focal length are shown in millimeters (mm). Surface numbers 0-15 represent the surfaces sequentially arranged from the object side to the image side along the optical axis. In Table 2, k represents the conic coefficient of the equation of the aspheric surface profiles. A4-20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
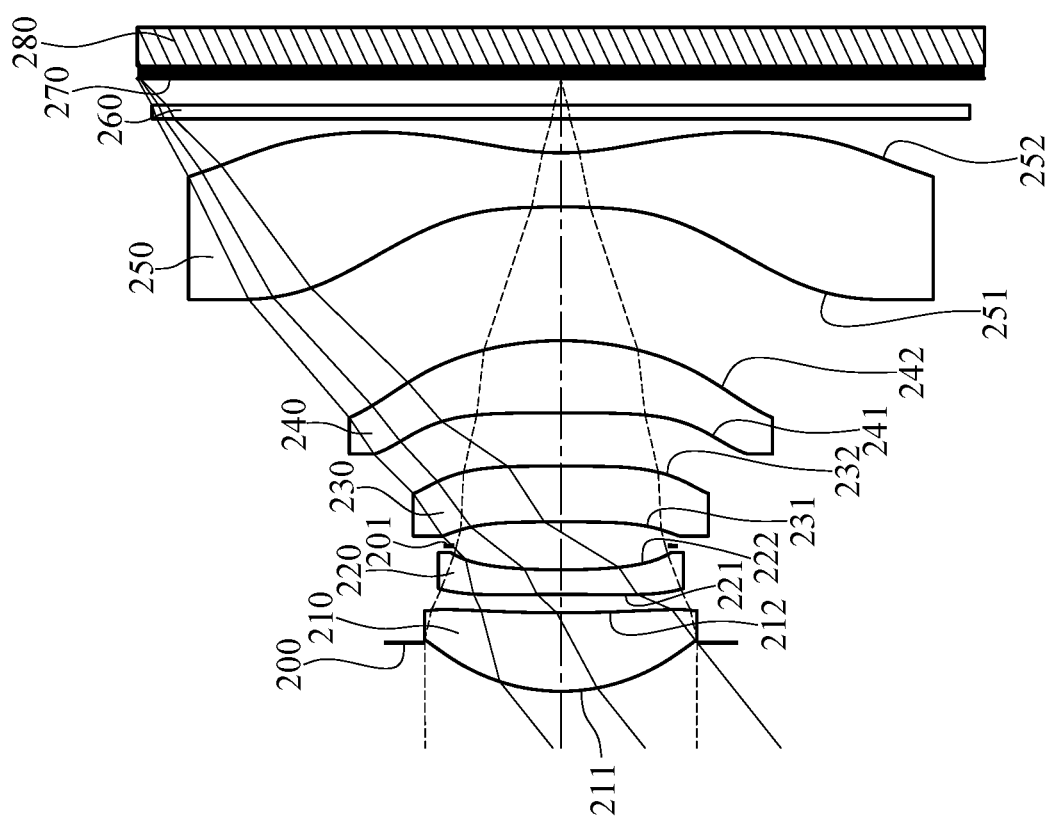
FIG. 3 is a schematic view of an image capturing unit according to the 2nd embodiment of the present disclosure.
Figure 4:
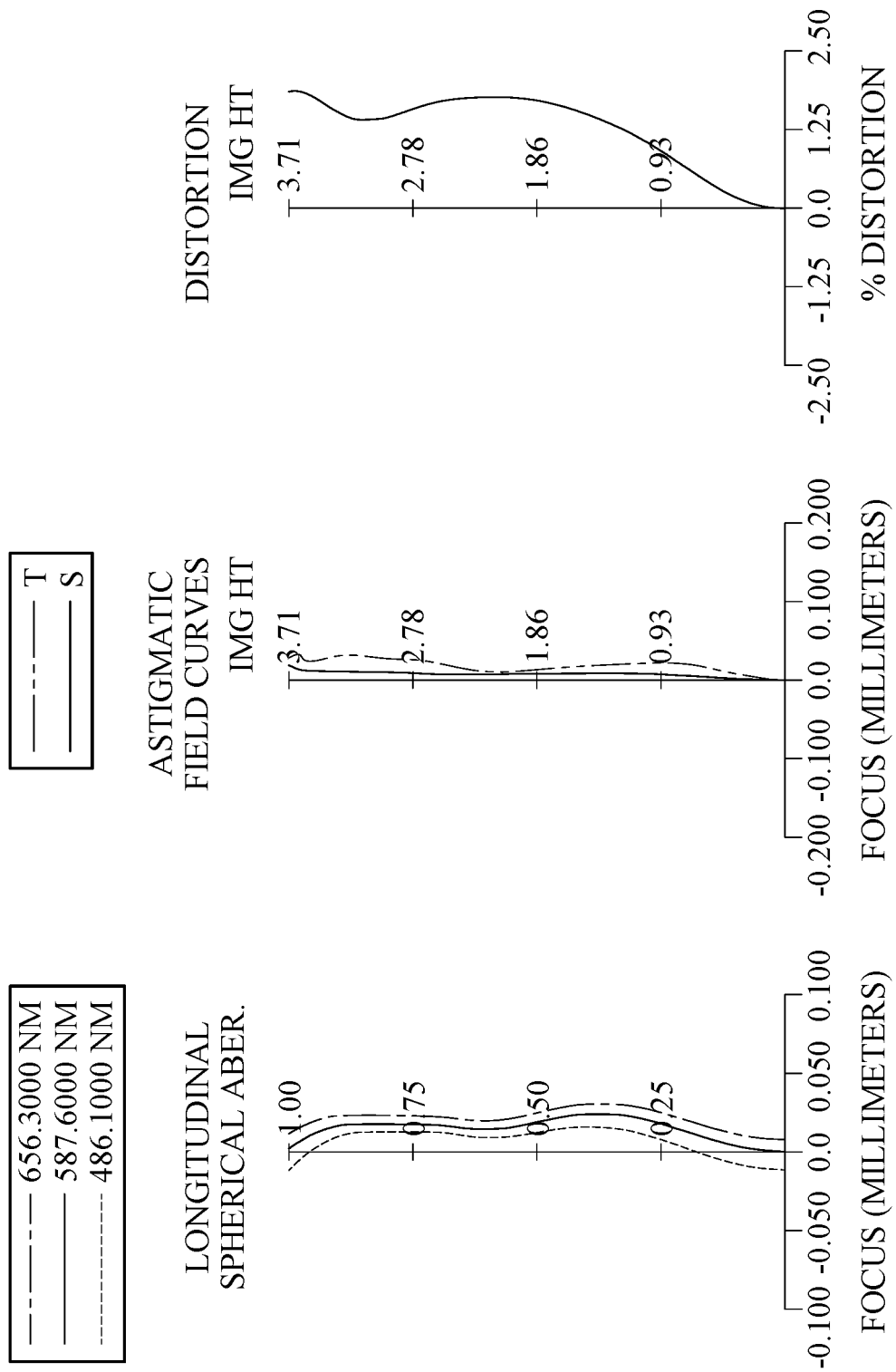
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical system (its reference numeral is omitted) of the present disclosure and an image sensor 280. The photographing optical system includes, in order from an object side to an image side, an aperture stop 200, a first lens element 210, a second lens element 220, a stop 201, a third lens element 230, a fourth lens element 240, a fifth lens element 250, a filter 260 and an image surface 270. The photographing optical system includes five lens elements (210, 220, 230, 240 and 250) with no additional lens element disposed between each of the adjacent five lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric. The object-side surface 211 of the first lens element 210 has one inflection point. The image-side surface 212 of the first lens element 210 has one inflection point.

The second lens element 220 with negative refractive power has an object-side surface 221 being concave in a paraxial region thereof and an image-side surface 222 being concave in a paraxial region thereof. The second lens element 220 is made of plastic material and has the object-side surface 221 and the image-side surface 222 being both aspheric. The object-side surface 221 of the second lens element 220 has one inflection point.

The third lens element 230 with negative refractive power has an object-side surface 231 being concave in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has one inflection point. The image-side surface 232 of the third lens element 230 has two inflection points.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric. The object-side surface 241 of the fourth lens element 240 has one inflection point. The image-side surface 242 of the fourth lens element 240 has one inflection point.

The fifth lens element 250 with negative refractive power has an object-side surface 251 being concave in a paraxial region thereof and an image-side surface 252 being concave in a paraxial region thereof. The fifth lens element 250 is made of plastic material and has the object-side surface 251 and the image-side surface 252 being both aspheric. The object-side surface 251 of the fifth lens element 250 has one inflection point. The image-side surface 252 of the fifth lens element 250 has three inflection points. The image-side surface 252 of the fifth lens element 250 has one critical point in an off-axis region thereof.

The filter 260 is made of glass material and located between the fifth lens element 250 and the image surface 270, and will not affect the focal length of the photographing optical system. The image sensor 280 is disposed on or near the image surface 270 of the photographing optical system.

The detailed optical data of the 2nd embodiment are shown in Table 3 and the aspheric surface data are shown in Table 4 below.

TABLE 3

2nd Embodiment
f = 4.48 mm, Fno = 1.90, HFOV = 38.6 deg.

| Surface # | | Curvature Radius | Thickness | Material | Index | Abbe # | Focal Length |
|---|---|---|---|---|---|---|---|
| 0 | Object | Plano | 480.000 | | | | |
| 1 | Ape. Stop | Plano | −0.430 | | | | |
| 2 | Lens 1 | 1.740 (ASP) | 0.692 | Plastic | 1.545 | 56.1 | 3.72 |
| 3 | | 10.612 (ASP) | 0.163 | | | | |
| 4 | Lens 2 | −33.990 (ASP) | 0.216 | Plastic | 1.669 | 19.4 | −8.18 |
| 5 | | 6.537 (ASP) | 0.212 | | | | |
| 6 | Stop | Plano | 0.211 | | | | |
| 7 | Lens 3 | −134.073 (ASP) | 0.491 | Plastic | 1.566 | 37.4 | −149.83 |
| 8 | | 231.146 (ASP) | 0.471 | | | | |

TABLE 3-continued

2nd Embodiment
f = 4.48 mm, Fno = 1.90, HFOV = 38.6 deg.

| Surface # | | Curvature Radius | Thickness | Material | Index | Abbe # | Focal Length |
|---|---|---|---|---|---|---|---|
| 9 | Lens 4 | −55.149 (ASP) | 0.636 | Plastic | 1.544 | 56.0 | 5.41 |
| 10 | | −2.807 (ASP) | 1.179 | | | | |
| 11 | Lens 5 | −13.373 (ASP) | 0.477 | Plastic | 1.544 | 56.0 | −3.48 |
| 12 | | 2.231 (ASP) | 0.300 | | | | |
| 13 | Filter | Plano | 0.120 | Glass | 1.517 | 64.2 | — |
| 14 | | Plano | 0.236 | | | | |
| 15 | Image | Plano | — | | | | |

Note:
Reference wavelength is 587.6 nm (d-line).
An effective radius of the stop 201 (Surface 6) is 0.960 mm.

TABLE 4

Aspheric Coefficients

| Surface # | | | | | |
|---|---|---|---|---|---|
| | 2 | 3 | 4 | 5 | 7 |
| k = | −7.1775E−01 | 3.1769E+01 | 9.0000E+01 | 3.3463E+01 | −9.9000E+01 |
| A4 = | 1.8386E−02 | −3.1524E−02 | −1.7432E−02 | −2.6925E−03 | −1.3070E−01 |
| A6 = | −7.0724E−03 | 1.4770E−02 | 1.2829E−01 | 1.0433E−01 | 1.0634E−01 |
| A8 = | 3.4601E−02 | 1.3451E−02 | −9.9203E−02 | −3.6470E−02 | −2.7536E−01 |
| A10 = | −5.4735E−02 | −3.2279E−02 | 3.4163E−02 | −4.3305E−02 | 4.2075E−01 |
| A12 = | 3.9970E−02 | 1.8999E−02 | 7.0552E−03 | 5.7260E−02 | −3.5048E−01 |
| A14 = | −1.2210E−02 | −5.6219E−03 | −6.2903E−03 | −1.1755E−02 | 1.2345E−01 |

| Surface # | | | | | |
|---|---|---|---|---|---|
| | 8 | 9 | 10 | 11 | 12 |
| k = | −9.9000E+01 | −9.9000E+01 | −1.3095E+01 | −1.6512E+00 | −9.5247E+00 |
| A4 = | −1.0658E−01 | −4.0515E−02 | −6.9723E−02 | −1.3319E−01 | −5.2082E−02 |
| A6 = | 1.4215E−02 | 6.9621E−04 | 4.3824E−02 | 6.4546E−02 | 1.9048E−02 |
| A8 = | −1.1186E−02 | −4.5513E−02 | −4.8392E−02 | −2.3457E−02 | −4.8621E−03 |
| A10 = | −5.0784E−03 | 7.2396E−02 | 4.2891E−02 | 7.3317E−03 | 7.5002E−04 |
| A12 = | 1.7292E−02 | −7.3120E−02 | −2.9229E−02 | −1.7043E−03 | −5.0821E−05 |
| A14 = | −1.2400E−02 | 4.5656E−02 | 1.3454E−02 | 2.6661E−04 | −2.9302E−06 |
| A16 = | 3.5850E−03 | −1.6041E−02 | −3.6281E−03 | −2.6155E−05 | 8.1754E−07 |
| A18 = | — | 2.9270E−03 | 5.0900E−04 | 1.4451E−06 | −5.6423E−08 |
| A20 = | — | −2.1712E−04 | −2.8503E−05 | −3.4187E−08 | 1.3549E−09 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 4.48 | TD/BL | 7.24 |
| Fno | 1.90 | TL/f | 1.21 |
| HFOV [deg.] | 38.6 | TL/ImgH | 1.46 |
| Nmax | 1.67 | (R9 − R10)/(R9 + R10) | 1.40 |
| V2 | 19.4 | f/|R5| + f/|R6| | 0.05 |
| V3 | 37.4 | f/R7 | −0.08 |
| Vmin | 19.4 | f1/f2 | −0.45 |
| BL/T45 | 0.56 | |f1/f4| | 0.69 |
| CT1/CT2 | 3.20 | |f2/f3| | 0.05 |
| (CT2 + CT3)/T23 | 1.67 | |f3/f5| | 43.10 |
| CT3/CT4 | 0.77 | |f4/f2| | 0.66 |
| T23/CT3 | 0.86 | f4/f5 | −1.56 |
| T45/CT1 | 1.70 | |f5/f1| | 0.94 |
| TD [mm] | 4.75 | Y31/SAG31 + Y32/SAG32 | −13.75 |

3rd Embodiment

Figure 5:
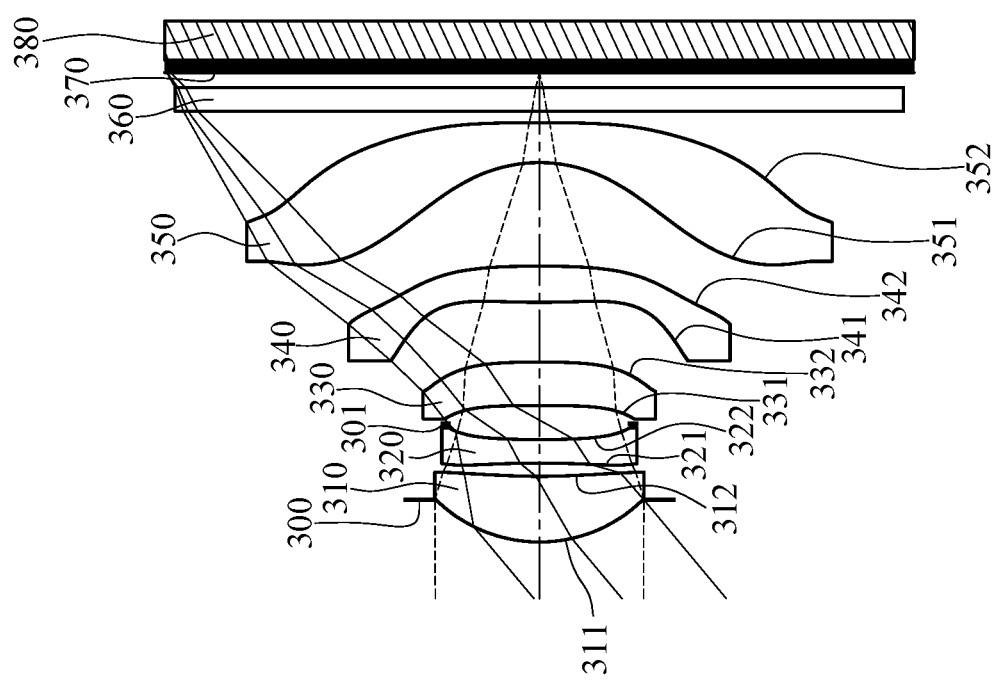
FIG. 5 is a schematic view of an image capturing unit according to the 3rd embodiment of the present disclosure.
Figure 6:
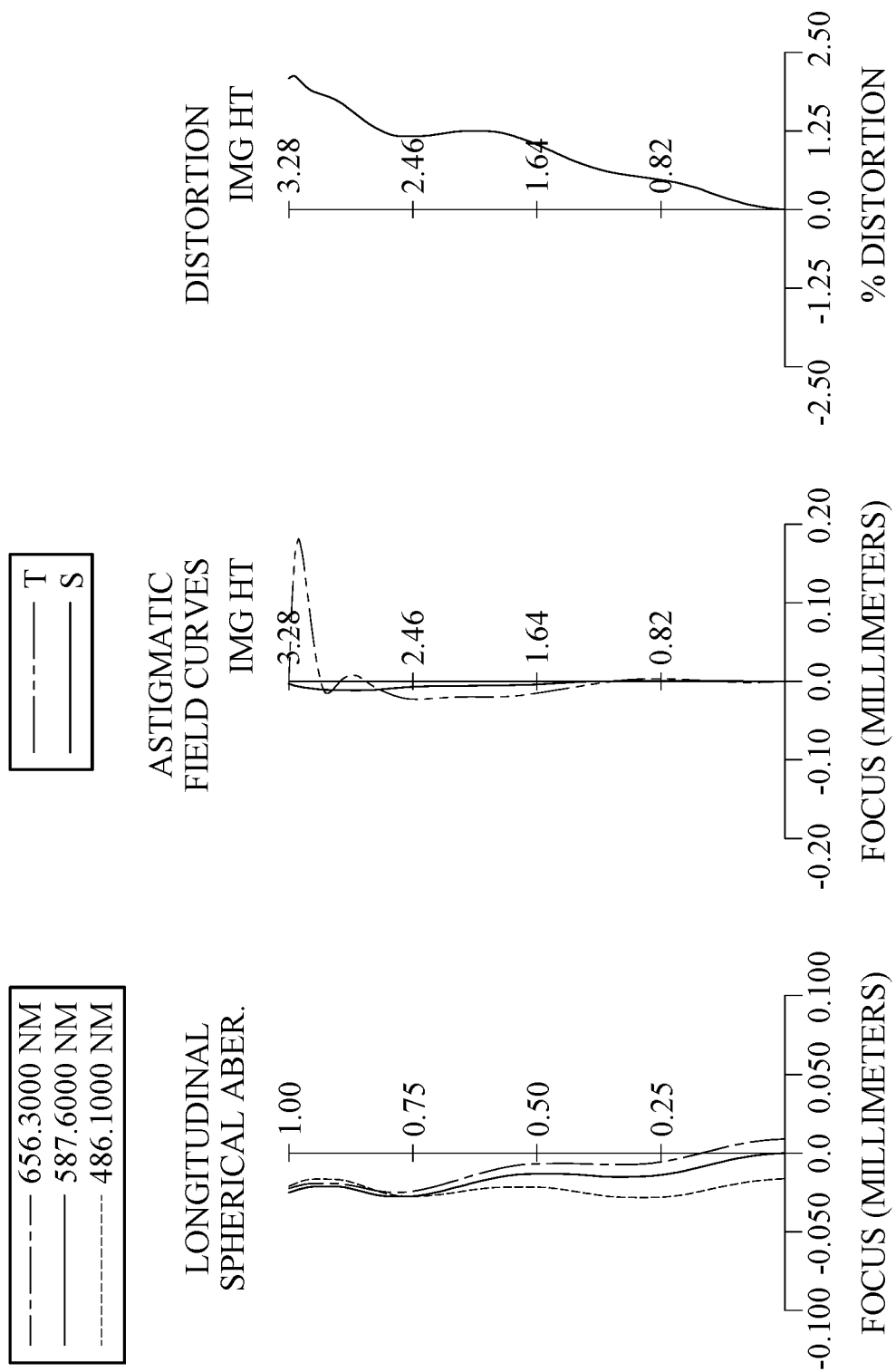
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical system (its reference numeral is omitted) of the present disclosure and an image sensor 380. The photographing optical system includes, in order from an object side to an image side, an aperture stop 300, a first lens element 310, a second lens element 320, a stop 301, a third lens element 330, a fourth lens element 340, a fifth lens element 350, a filter 360 and an image surface 370. The photographing optical system includes five lens elements (310, 320, 330, 340 and 350) with no additional lens element disposed between each of the adjacent five lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric. The image-side surface 312 of the first lens element 310 has one inflection point.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric. The object-side surface 321 of the second lens element 320 has one inflection point.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric. The object-side surface 331 of the third lens element 330 has one inflection point. The image-side surface 332 of the third lens element 330 has one inflection point.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric. The object-side surface 341 of the fourth lens element 340 has two inflection points. The image-side surface 342 of the fourth lens element 340 has two inflection points.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. The object-side surface 351 of the fifth lens element 350 has two inflection points. The image-side surface 352 of the fifth lens element 350 has two inflection points. The object-side surface 351 of the fifth lens element 350 has one critical point in an off-axis region thereof.

The filter 360 is made of glass material and located between the fifth lens element 350 and the image surface 370, and will not affect the focal length of the photographing optical system. The image sensor 380 is disposed on or near the image surface 370 of the photographing optical system.

The detailed optical data of the 3rd embodiment are shown in Table 5 and the aspheric surface data are shown in Table 6 below.

TABLE 5

3rd Embodiment
f = 3.79 mm, Fno = 2.10, HFOV = 39.9 deg.

| Surface # | | Curvature Radius | Thickness | Material | Index | Abbe # | Focal Length |
|---|---|---|---|---|---|---|---|
| 0 | Object | Plano | 380.000 | | | | |
| 1 | Ape. Stop | Plano | −0.373 | | | | |
| 2 | Lens 1 | 1.308 (ASP) | 0.579 | Plastic | 1.545 | 56.1 | 2.99 |
| 3 | | 5.582 (ASP) | 0.116 | | | | |
| 4 | Lens 2 | −13.996 (ASP) | 0.208 | Plastic | 1.669 | 19.4 | −6.96 |
| 5 | | 7.016 (ASP) | 0.142 | | | | |
| 6 | Stop | Plano | 0.157 | | | | |
| 7 | Lens 3 | 239.814 (ASP) | 0.385 | Plastic | 1.566 | 37.4 | 19.06 |
| 8 | | −11.293 (ASP) | 0.527 | | | | |
| 9 | Lens 4 | 7.076 (ASP) | 0.319 | Plastic | 1.544 | 56.0 | 7.12 |
| 10 | | −8.415 (ASP) | 0.913 | | | | |
| 11 | Lens 5 | −1.303 (ASP) | 0.352 | Plastic | 1.534 | 55.9 | −2.57 |
| 12 | | −28.600 (ASP) | 0.100 | | | | |
| 13 | Filter | Plano | 0.210 | Glass | 1.517 | 64.2 | — |
| 14 | | Plano | 0.133 | | | | |
| 15 | Image | Plano | — | | | | |

Note:
Reference wavelength is 587.6 nm (d-line).
An effective radius of the stop 301 (Surface 6) is 0.800 mm.

TABLE 6

Aspheric Coefficients

| | Surface # | | | | |
|---|---|---|---|---|---|
| | 2 | 3 | 4 | 5 | 7 |
| k = | −7.3763E−01 | 2.6262E+01 | −9.7707E+01 | 4.9939E+01 | 0.0000E+00 |
| A4 = | 5.4928E−02 | −1.2662E−01 | −1.4783E−01 | −9.5719E−02 | −2.7312E−01 |
| A6 = | −6.4897E−02 | 1.0901E−01 | 4.3821E−01 | 6.2328E−01 | 3.1713E−01 |
| A8 = | 3.1493E−01 | −4.6662E−02 | −1.9805E−01 | −1.0524E+00 | −9.8211E−01 |
| A10 = | −5.9475E−01 | −1.0554E−01 | −4.9956E−01 | 1.6995E+00 | 1.8927E+00 |
| A12 = | 5.9482E−01 | 2.0253E−01 | 8.8803E−01 | −1.9012E+00 | −2.3871E+00 |
| A14 = | −2.4995E−01 | −1.4770E−01 | −4.2924E−01 | 1.1353E+00 | 1.2744E+00 |

TABLE 6-continued

| Aspheric Coefficients | | | | | |
|---|---|---|---|---|---|
| | Surface # | | | | |
| | 8 | 9 | 10 | 11 | 12 |
| k = | 2.0000E+01 | 0.0000E+00 | −9.6387E+01 | −1.0151E+00 | 8.9368E+01 |
| A4 = | −2.2758E−01 | −1.1754E−01 | −5.8974E−02 | −4.3418E−02 | −5.2229E−02 |
| A6 = | 6.3194E−02 | −1.8443E−01 | −9.7472E−02 | −3.0267E−02 | −2.8698E−02 |
| A8 = | 7.3766E−02 | 4.8133E−01 | 1.5515E−01 | 1.0960E−01 | 5.5494E−02 |
| A10 = | −6.2858E−01 | −1.0805E+00 | −1.9813E−01 | −7.8259E−02 | −3.5022E−02 |
| A12 = | 1.2354E+00 | 1.5054E+00 | 1.7175E−01 | 2.9364E−02 | 1.2298E−02 |
| A14 = | −1.1718E+00 | −1.3263E+00 | −8.3130E−02 | −6.5894E−03 | −2.6578E−03 |
| A16 = | 4.5376E−01 | 7.0340E−01 | 2.1673E−02 | 8.8787E−04 | 3.5069E−04 |
| A18 = | — | −2.0095E−01 | −2.8077E−03 | −6.6313E−05 | −2.5734E−05 |
| A20 = | — | 2.3725E−02 | 1.3454E−04 | 2.1103E−06 | 7.9904E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.79 | TD/BL | 8.35 |
| Fno | 2.10 | TL/f | 1.09 |
| HFOV [deg.] | 39.9 | TL/ImgH | 1.26 |
| Nmax | 1.67 | (R9 − R10)/(R9 + R10) | −0.91 |
| V2 | 19.4 | f/|R5| + f/|R6| | 0.35 |
| V3 | 37.4 | f/R7 | 0.54 |
| Vmin | 19.4 | f1/f2 | −0.43 |
| BL/T45 | 0.49 | |f1/f4| | 0.42 |
| CT1/CT2 | 2.78 | |f2/f3| | 0.36 |
| (CT2 + CT3)/T23 | 1.98 | |f3/f5| | 7.42 |
| CT3/CT4 | 1.21 | |f4/f2| | 1.02 |
| T23/CT3 | 0.78 | f4/f5 | −2.77 |
| T45/CT1 | 1.58 | |f5/f1| | 0.86 |
| TD [mm] | 3.70 | Y31/SAG31 + Y32/SAG32 | −11.05 |

4th Embodiment

Figure 7:
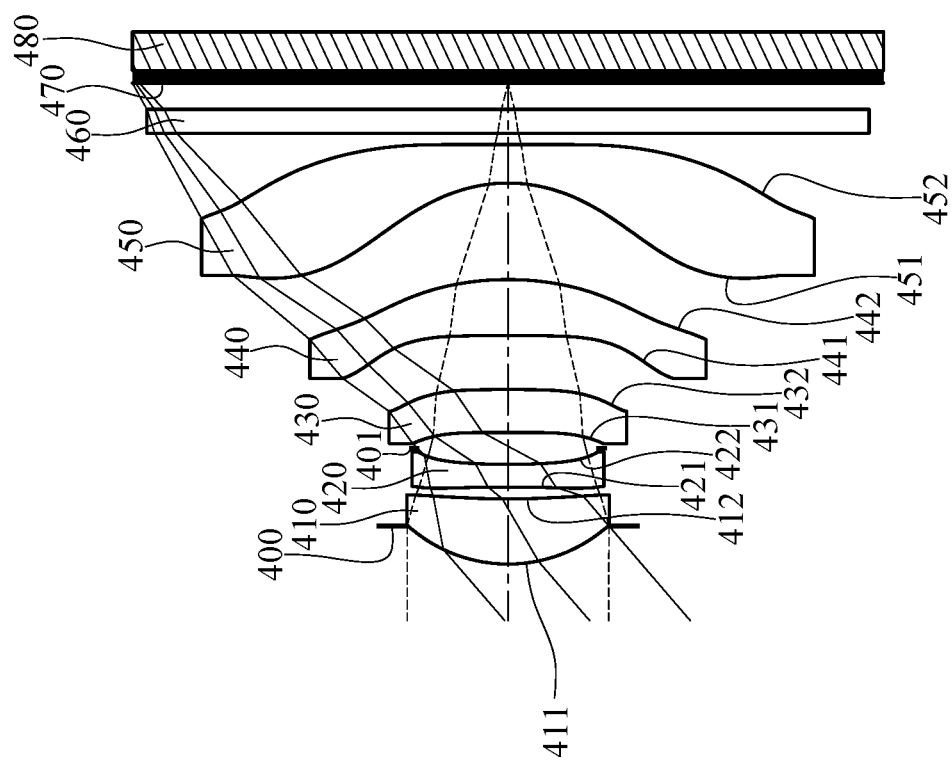
FIG. 7 is a schematic view of an image capturing unit according to the 4th embodiment of the present disclosure.
Figure 8:
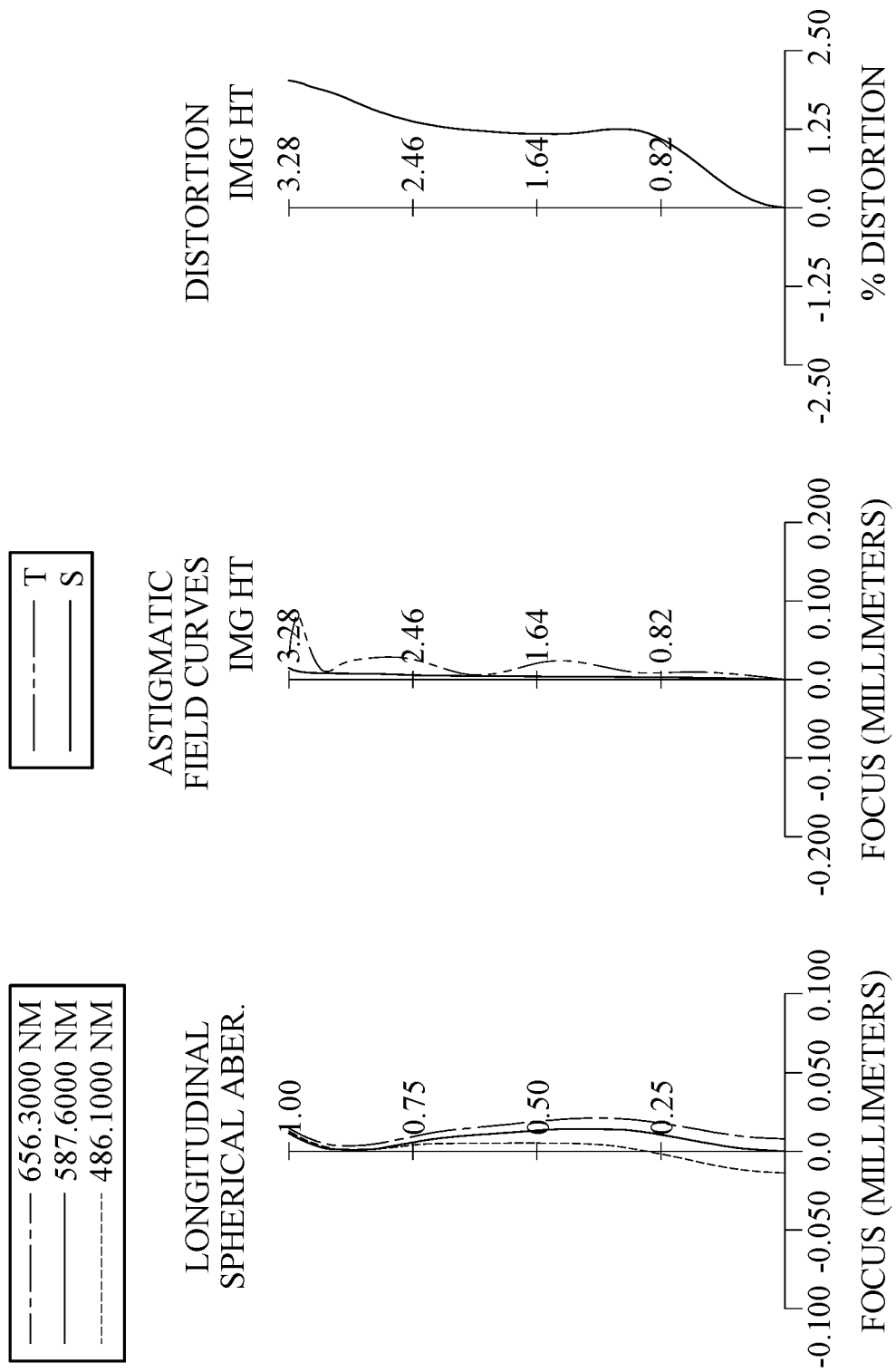
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical system (its reference numeral is omitted) of the present disclosure and an image sensor 480. The photographing optical system includes, in order from an object side to an image side, an aperture stop 400, a first lens element 410, a second lens element 420, a stop 401, a third lens element 430, a fourth lens element 440, a fifth lens element 450, a filter 460 and an image surface 470. The photographing optical system includes five lens elements (410, 420, 430, 440 and 450) with no additional lens element disposed between each of the adjacent five lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. The image-side surface 412 of the first lens element 410 has one inflection point.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric. The object-side surface 421 of the second lens element 420 has one inflection point.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric. The object-side surface 431 of the third lens element 430 has two inflection points. The image-side surface 432 of the third lens element 430 has one inflection point.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric. The object-side surface 441 of the fourth lens element 440 has two inflection points. The image-side surface 442 of the fourth lens element 440 has three inflection points.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. The object-side surface 451 of the fifth lens element 450 has two inflection points. The image-side surface 452 of the fifth lens element 450 has four inflection points. The object-side surface 451 of the fifth lens element 450 has one critical point in an off-axis region thereof.

The filter 460 is made of glass material and located between the fifth lens element 450 and the image surface 470, and will not affect the focal length of the photographing optical system. The image sensor 480 is disposed on or near the image surface 470 of the photographing optical system.

The detailed optical data of the 4th embodiment are shown in Table 7 and the aspheric surface data are shown in Table 8 below.

TABLE 7

4th Embodiment
f = 3.67 mm, Fno = 2.10, HFOV = 40.7 deg.

| Surface # | | Curvature Radius | Thickness | Material | Index | Abbe # | Focal Length |
|---|---|---|---|---|---|---|---|
| 0 | Object | Plano | 380.000 | | | | |
| 1 | Ape. Stop | Plano | −0.336 | | | | |
| 2 | Lens 1 | 1.332 (ASP) | 0.574 | Plastic | 1.545 | 56.1 | 3.00 |
| 3 | | 6.064 (ASP) | 0.105 | | | | |
| 4 | Lens 2 | −17.651 (ASP) | 0.200 | Plastic | 1.669 | 19.4 | −6.89 |
| 5 | | 6.271 (ASP) | 0.144 | | | | |
| 6 | Stop | Plano | 0.137 | | | | |
| 7 | Lens 3 | 38.079 (ASP) | 0.379 | Plastic | 1.566 | 37.4 | 32.11 |
| 8 | | −34.649 (ASP) | 0.475 | | | | |
| 9 | Lens 4 | 380.223 (ASP) | 0.495 | Plastic | 1.544 | 56.0 | 4.62 |
| 10 | | −2.528 (ASP) | 0.851 | | | | |
| 11 | Lens 5 | −1.336 (ASP) | 0.340 | Plastic | 1.534 | 55.9 | −2.55 |
| 12 | | −77.594 (ASP) | 0.100 | | | | |
| 13 | Filter | Plano | 0.210 | Glass | 1.517 | 64.2 | — |
| 14 | | Plano | 0.232 | | | | |
| 15 | Image | Plano | — | | | | |

Note:
Reference wavelength is 587.6 nm (d-line).
An effective radius of the stop 401 (Surface 6) is 0.800 mm.

TABLE 8

Aspheric Coefficients

| Surface # | | | | |
|---|---|---|---|---|
| 2 | 3 | 4 | 5 | 7 |
| k = −6.0663E−01 | 2.3708E+01 | 8.8925E+01 | 4.5822E+01 | 4.4623E+01 |
| A4 = 3.2744E−02 | −1.0028E−01 | −1.0692E−01 | −5.9485E−02 | −2.6301E−01 |
| A6 = 2.9569E−02 | 3.0427E−02 | 3.7313E−01 | 3.7299E−01 | 2.9954E−01 |
| A8 = −1.2027E−03 | 3.1869E−01 | −7.5097E−03 | −5.2555E−02 | −9.6284E−01 |
| A10 = −6.8675E−02 | −9.2225E−01 | −9.6977E−01 | −7.8252E−01 | 1.9192E+00 |
| A12 = 1.5537E−01 | 1.1214E+00 | 1.5362E+00 | 1.2683E+00 | −2.3710E+00 |
| A14 = −1.0643E−01 | −5.6219E−01 | −7.9149E−01 | −4.9151E−01 | 1.3220E+00 |

| Surface # | | | | |
|---|---|---|---|---|
| 8 | 9 | 10 | 11 | 12 |
| k = 2.0000E+01 | −4.5000E+00 | −1.9924E+01 | −1.0183E+00 | −1.0086E+01 |
| A4 = −2.3141E−01 | −1.1998E−01 | −1.6293E−01 | 3.9826E−02 | 3.6361E−02 |
| A6 = 3.1134E−01 | 1.7088E−01 | 1.8760E−01 | −1.2292E−01 | −9.9241E−02 |
| A8 = −1.0734E+00 | −5.7968E−01 | −2.3341E−01 | 1.4517E−01 | 7.6441E−02 |
| A10 = 2.1973E+00 | 9.9579E−01 | 1.7738E−01 | −7.6210E−02 | −3.3230E−02 |
| A12 = −2.6176E+00 | −1.0582E+00 | −6.2006E−02 | 2.3012E−02 | 9.0145E−03 |
| A14 = 1.6375E+00 | 6.9889E−01 | 4.0366E−03 | −4.2765E−03 | −1.5606E−03 |
| A16 = −3.8860E−01 | −2.7318E−01 | 3.4939E−03 | 4.8359E−04 | 1.6751E−04 |
| A18 = — | 5.7839E−02 | −9.9146E−04 | −3.0481E−05 | −1.0111E−05 |
| A20 = — | −5.1363E−03 | 8.3546E−05 | 8.1733E−07 | 2.6072E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.67 | TD/BL | 6.83 |
| Fno | 2.10 | TL/f | 1.16 |
| HFOV [deg.] | 40.7 | TL/ImgH | 1.29 |
| Nmax | 1.67 | (R9 − R10)/(R9 + R10) | −0.97 |
| V2 | 19.4 | f/|R5| + f/|R6| | 0.20 |
| V3 | 37.4 | f/R7 | 0.01 |
| Vmin | 19.4 | f1/f2 | −0.44 |
| BL/T45 | 0.64 | |f1/f4| | 0.65 |
| CT1/CT2 | 2.87 | |f2/f3| | 0.21 |
| (CT2 + CT3)/T23 | 2.06 | |f3/f5| | 12.59 |
| CT3/CT4 | 0.77 | |f4/f2| | 0.67 |
| T23/CT3 | 0.74 | f4/f5 | −1.81 |
| T45/CT1 | 1.48 | |f5/f1| | 0.85 |
| TD [mm] | 3.70 | Y31/SAG31 + Y32/SAG32 | −14.09 |

5th Embodiment

Figure 9:
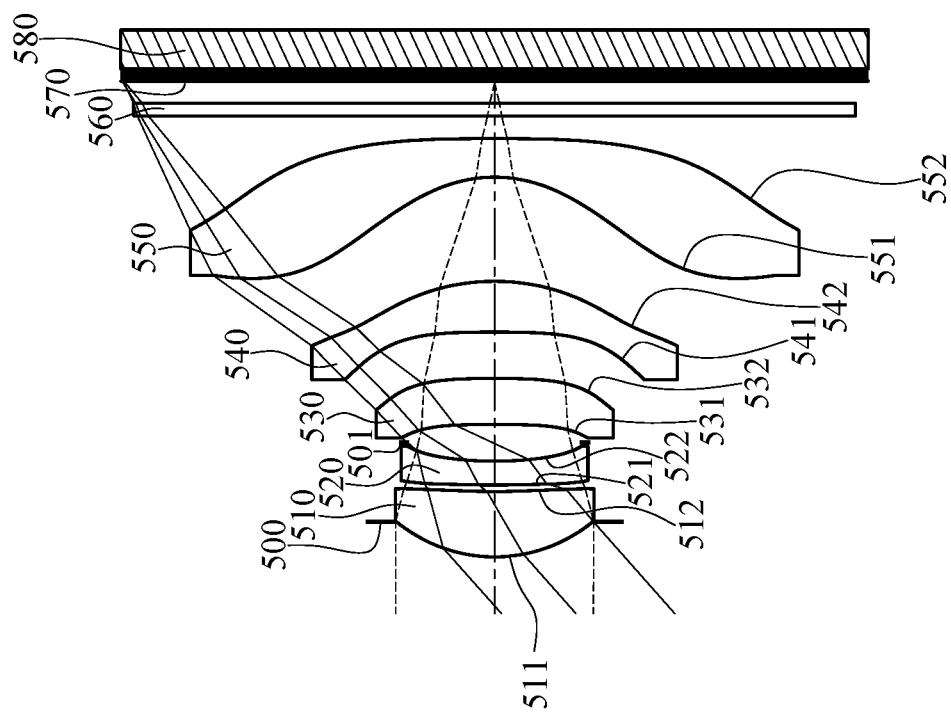
FIG. 9 is a schematic view of an image capturing unit according to the 5th embodiment of the present disclosure.
Figure 10:
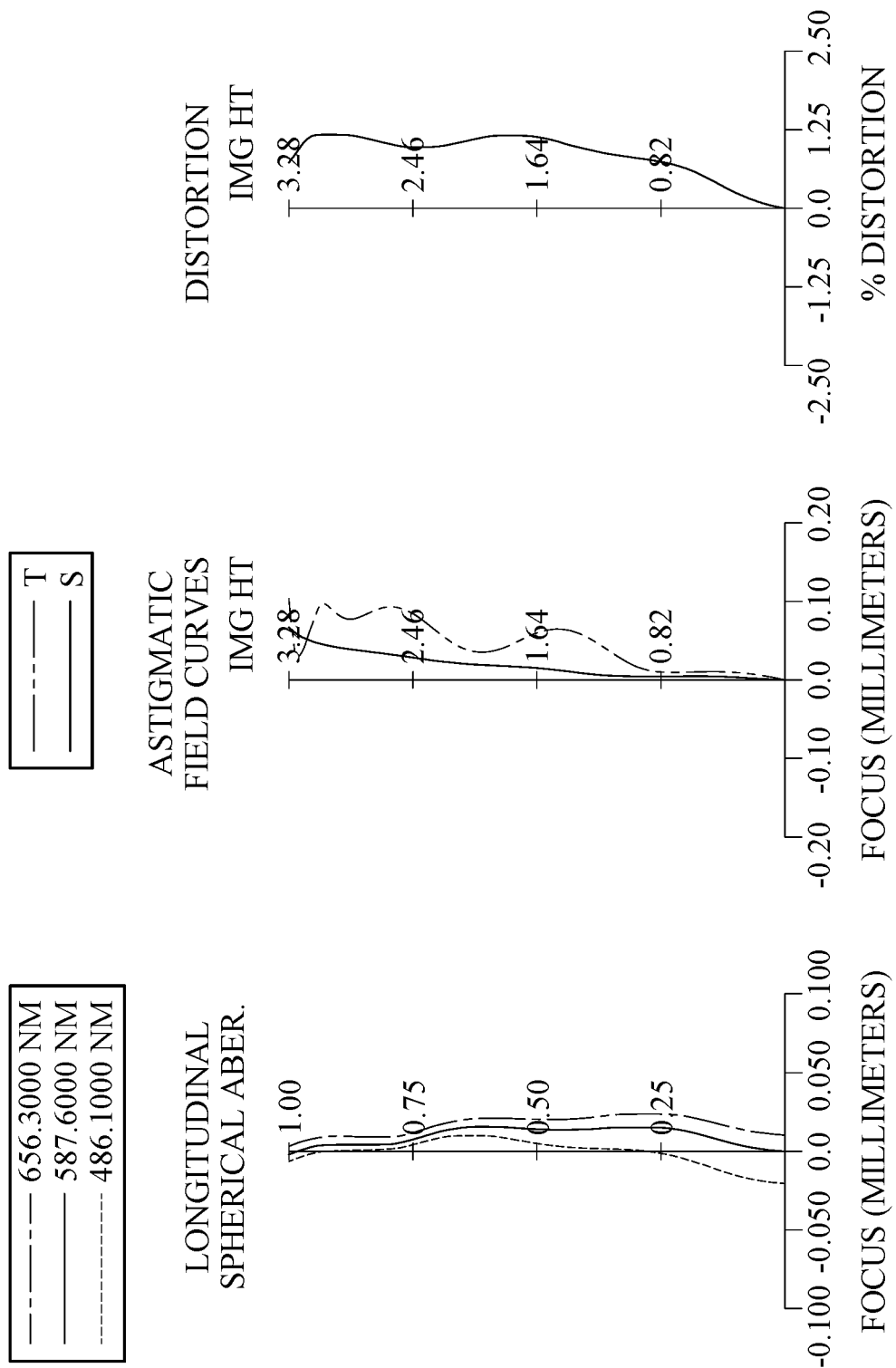
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical system (its reference numeral is omitted) of the present disclosure and an image sensor 580. The photographing optical system includes, in order from an object side to an image side, an aperture stop 500, a first lens element 510, a second lens element 520, a stop 501, a third lens element 530, a fourth lens element 540, a fifth lens element 550, a filter 560 and an image surface 570. The photographing optical system includes five lens elements (510, 520, 530, 540 and 550) with no additional lens element disposed between each of the adjacent five lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric. The image-side surface 512 of the first lens element 510 has three inflection points.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric. The object-side surface 521 of the second lens element 520 has three inflection points.

The third lens element 530 with positive refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric. The image-side surface 532 of the third lens element 530 has one inflection point.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric. The object-side surface 541 of the fourth lens element 540 has one inflection point. The image-side surface 542 of the fourth lens element 540 has two inflection points.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric. The object-side surface 551 of the fifth lens element 550 has one inflection point. The image-side surface 552 of the fifth lens element 550 has two inflection points. The object-side surface 551 of the fifth lens element 550 has one critical point in an off-axis region thereof.

The filter 560 is made of glass material and located between the fifth lens element 550 and the image surface 570, and will not affect the focal length of the photographing optical system. The image sensor 580 is disposed on or near the image surface 570 of the photographing optical system.

The detailed optical data of the 5th embodiment are shown in Table 9 and the aspheric surface data are shown in Table 10 below.

TABLE 9

5th Embodiment
f = 3.60 mm, Fno = 2.10, HFOV = 41.6 deg.

| Surface # | | Curvature Radius | Thickness | Material | Index | Abbe # | Focal Length |
|---|---|---|---|---|---|---|---|
| 0 | Object | Plano | 350.000 | | | | |
| 1 | Ape. Stop | Plano | −0.309 | | | | |
| 2 | Lens 1 | 1.360 (ASP) | 0.576 | Plastic | 1.545 | 56.1 | 3.21 |
| 3 | | 5.195 (ASP) | 0.058 | | | | |
| 4 | Lens 2 | 7.325 (ASP) | 0.210 | Plastic | 1.669 | 19.4 | −8.71 |
| 5 | | 3.208 (ASP) | 0.165 | | | | |
| 6 | Stop | Plano | 0.159 | | | | |
| 7 | Lens 3 | −17.131 (ASP) | 0.406 | Plastic | 1.544 | 56.0 | 62.52 |
| 8 | | −11.488 (ASP) | 0.409 | | | | |
| 9 | Lens 4 | −15.500 (ASP) | 0.447 | Plastic | 1.544 | 56.0 | 4.05 |
| 10 | | −1.950 (ASP) | 0.919 | | | | |
| 11 | Lens 5 | −1.227 (ASP) | 0.340 | Plastic | 1.534 | 55.9 | −2.40 |
| 12 | | −32.200 (ASP) | 0.200 | | | | |
| 13 | Filter | Plano | 0.110 | Glass | 1.517 | 64.2 | — |
| 14 | | Plano | 0.191 | | | | |
| 15 | Image | Plano | — | | | | |

Note:
Reference wavelength is 587.6 nm (d-line).
An effective radius of the stop 501 (Surface 6) is 0.770 mm.

TABLE 10

Aspheric Coefficients

| Surface # | 2 | 3 | 4 | 5 | 7 |
|---|---|---|---|---|---|
| k = | −8.1643E+00 | 0.0000E+00 | −2.5208E+01 | 3.3421E+00 | 0.0000E+00 |
| A4 = | 4.0282E−01 | −2.3960E−01 | −2.4471E−01 | −2.8860E−03 | −1.9702E−01 |
| A6 = | −6.2358E−01 | 4.6456E−01 | 5.5533E−01 | −6.0802E−01 | −4.3053E−01 |
| A8 = | 1.2207E+00 | −4.0805E−01 | 1.6362E−01 | 6.8511E+00 | 6.8988E−01 |
| A10 = | −1.7732E+00 | −2.3214E−01 | −2.2338E+00 | −2.7005E+01 | −2.9957E+00 |
| A12 = | 1.5289E+00 | 9.3163E−01 | 3.6628E+00 | 5.5878E+01 | 5.3374E+00 |
| A14 = | −5.7411E−01 | −6.9839E−01 | −2.0613E+00 | −5.8672E+01 | −4.6073E+00 |
| A16 = | — | — | — | 2.4715E+01 | 1.5995E+00 |

| Surface # | 8 | 9 | 10 | 11 | 12 |
|---|---|---|---|---|---|
| k = | −8.8545E+01 | 0.0000E+00 | −7.3855E+00 | −1.0000E+00 | 0.0000E+00 |
| A4 = | −2.5329E−01 | −1.7896E−01 | −1.5586E−01 | −3.4525E−01 | −3.9064E−02 |
| A6 = | 5.1395E−01 | 3.3320E−01 | 8.0776E−02 | 8.1142E−02 | 1.5768E−02 |
| A8 = | −1.8461E+00 | −9.7598E−01 | 5.4610E−02 | −5.4632E−02 | −4.7892E−03 |
| A10 = | 3.6388E+00 | 1.7276E+00 | −2.4861E−01 | 2.9207E−02 | 7.2451E−04 |
| A12 = | −4.1126E+00 | −1.9776E+00 | 3.3372E−01 | −1.0392E−02 | −8.8806E−05 |
| A14 = | 2.3830E+00 | 1.4457E+00 | −2.1827E−01 | 2.2782E−03 | 1.7676E−05 |
| A16 = | −5.2912E−01 | −6.4502E−01 | 7.5699E−02 | −2.9715E−04 | −2.6319E−06 |
| A18 = | — | 1.5969E−01 | −1.3435E−02 | 2.1225E−05 | 1.9469E−07 |
| A20 = | — | −1.6762E−02 | 9.6287E−04 | −6.4073E−07 | −5.8269E−09 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.60 | TD/BL | 7.36 |
| Fno | 2.10 | TL/f | 1.16 |
| HFOV [deg.] | 41.6 | TL/ImgH | 1.28 |
| Nmax | 1.67 | (R9 − R10)/(R9 + R10) | −0.93 |
| V2 | 19.4 | f/|R5| + f/|R6| | 0.52 |
| V3 | 56.0 | f/R7 | −0.23 |
| Vmin | 19.4 | f1/f2 | −0.37 |
| BL/T45 | 0.55 | |f1/f4| | 0.79 |
| CT1/CT2 | 2.74 | |f2/f3| | 0.14 |
| (CT2 + CT3)/T23 | 1.90 | |f3/f5| | 26.06 |
| CT3/CT4 | 0.91 | |f4/f2| | 0.47 |
| T23/CT3 | 0.80 | f4/f5 | −1.69 |
| T45/CT1 | 1.60 | |f5/f1| | 0.75 |
| TD [mm] | 3.69 | Y31/SAG31 + Y32/SAG32 | −10.68 |

6th Embodiment

Figure 11:
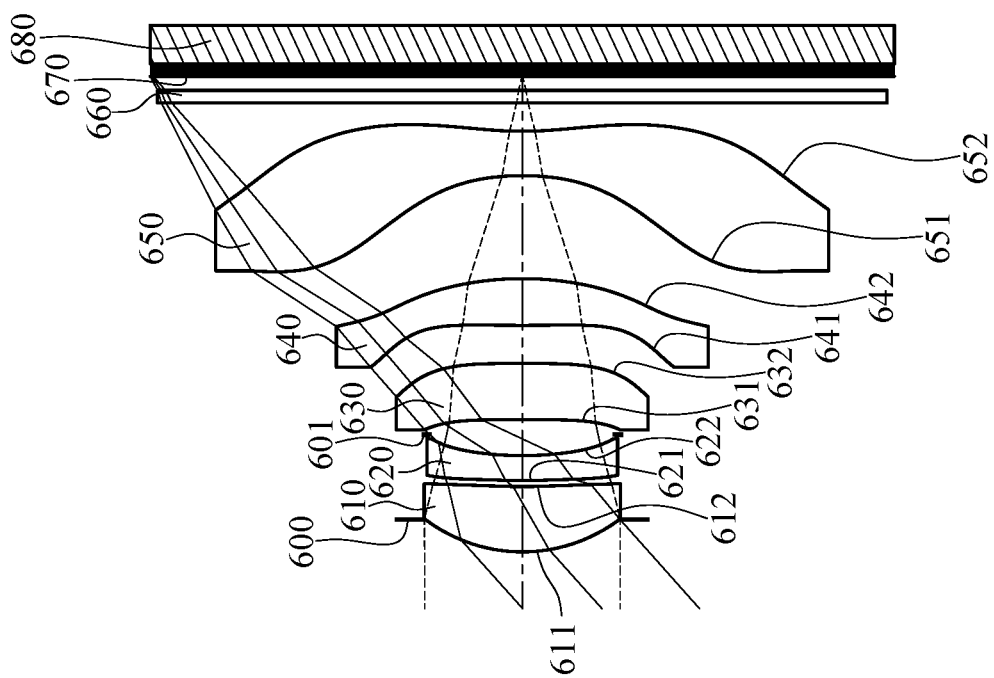
FIG. 11 is a schematic view of an image capturing unit according to the 6th embodiment of the present disclosure.
Figure 12:
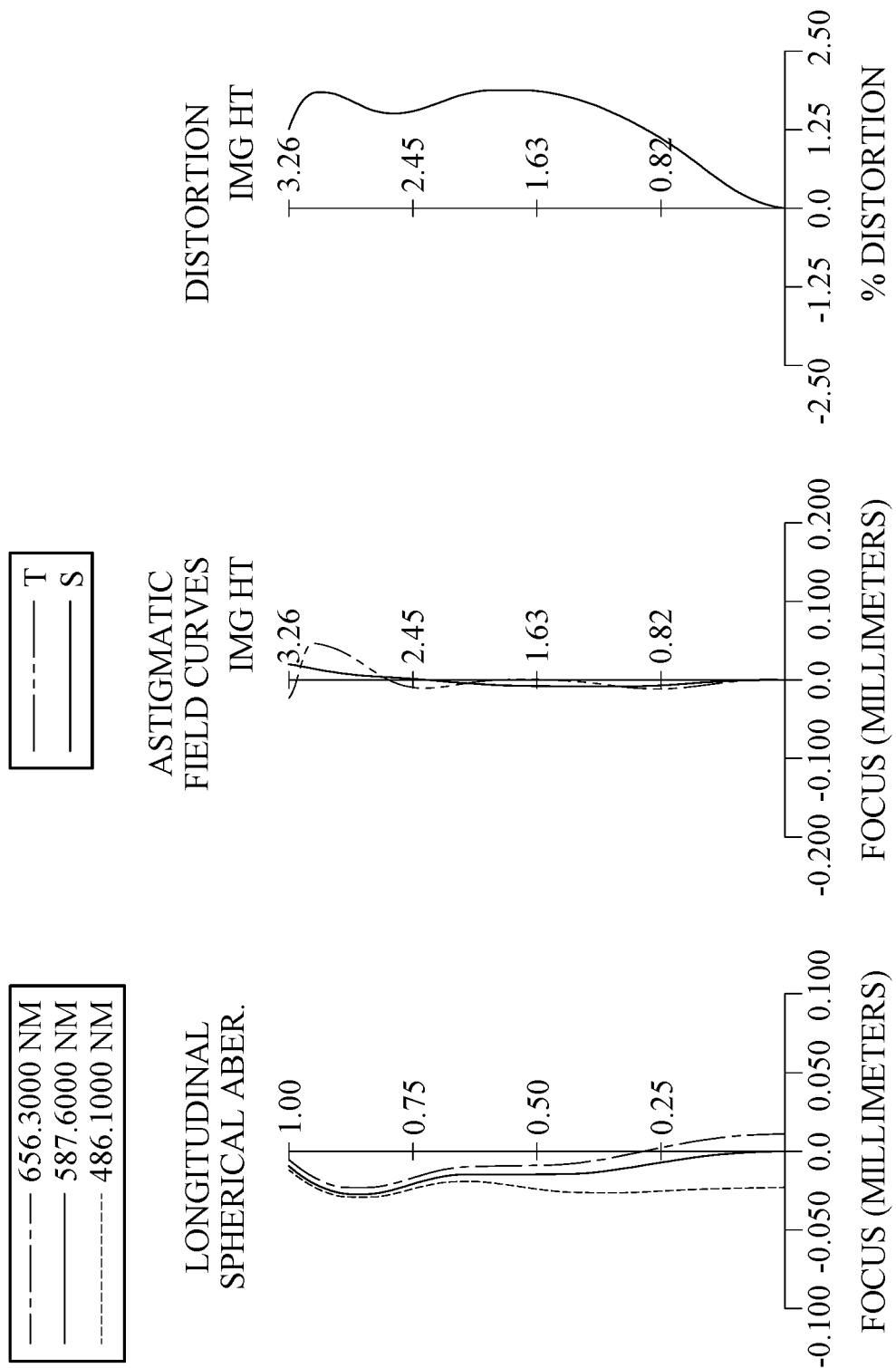
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical system (its reference numeral is omitted) of the present disclosure and an image sensor 680. The photographing optical system includes, in order from an object side to an image side, an aperture stop 600, a first lens element 610, a second lens element 620, a stop 601, a third lens element 630, a fourth lens element 640, a fifth lens element 650, a filter 660 and an image surface 670. The photographing optical system includes five lens elements (610, 620, 630, 640 and 650) with no additional lens element disposed between each of the adjacent five lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric. The image-side surface 612 of the first lens element 610 has three inflection points.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has two inflection points.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric. The object-side surface 631 of the third lens element 630 has one inflection point. The image-side surface 632 of the third lens element 630 has one inflection point.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric. The object-side surface 641 of the fourth lens element 640 has two inflection points. The image-side surface 642 of the fourth lens element 640 has two inflection points.

The fifth lens element 650 with negative refractive power has an object-side surface 651 being concave in a paraxial region thereof and an image-side surface 652 being concave in a paraxial region thereof. The fifth lens element 650 is made of plastic material and has the object-side surface 651 and the image-side surface 652 being both aspheric. The object-side surface 651 of the fifth lens element 650 has one inflection point. The image-side surface 652 of the fifth lens element 650 has three inflection points. The object-side surface 651 of the fifth lens element 650 has one critical point in an off-axis region thereof. The image-side surface 652 of the fifth lens element 650 has one critical point in an off-axis region thereof.

The filter 660 is made of glass material and located between the fifth lens element 650 and the image surface 670, and will not affect the focal length of the photographing optical system. The image sensor 680 is disposed on or near the image surface 670 of the photographing optical system.

The detailed optical data of the 6th embodiment are shown in Table 11 and the aspheric surface data are shown in Table 12 below.

TABLE 11

6th Embodiment
f = 3.56 mm, Fno = 2.10, HFOV = 41.8 deg.

| Surface # | | Curvature Radius | Thickness | Material | Index | Abbe # | Focal Length |
|---|---|---|---|---|---|---|---|
| 0 | Object | Plano | 350.000 | | | | |
| 1 | Ape. Stop | Plano | −0.284 | | | | |
| 2 | Lens 1 | 1.414 (ASP) | 0.576 | Plastic | 1.545 | 56.1 | 3.48 |
| 3 | | 4.749 (ASP) | 0.053 | | | | |
| 4 | Lens 2 | 4.901 (ASP) | 0.220 | Plastic | 1.669 | 19.4 | −10.26 |
| 5 | | 2.808 (ASP) | 0.185 | | | | |
| 6 | Stop | Plano | 0.132 | | | | |
| 7 | Lens 3 | 389.016 (ASP) | 0.496 | Plastic | 1.544 | 56.0 | 64.53 |
| 8 | | −38.570 (ASP) | 0.336 | | | | |
| 9 | Lens 4 | 17.010 (ASP) | 0.412 | Plastic | 1.544 | 56.0 | 4.33 |
| 10 | | −2.709 (ASP) | 0.908 | | | | |
| 11 | Lens 5 | −2.354 (ASP) | 0.392 | Plastic | 1.534 | 55.9 | −2.51 |
| 12 | | 3.300 (ASP) | 0.250 | | | | |
| 13 | Filter | Plano | 0.110 | Glass | 1.517 | 64.2 | — |
| 14 | | Plano | 0.123 | | | | |
| 15 | Image | Plano | — | | | | |

Note:
Reference wavelength is 587.6 nm (d-line).
An effective radius of the stop 601 (Surface 6) is 0.815 mm.

TABLE 12

Aspheric Coefficients

| Surface # | | | | |
|---|---|---|---|---|
| | 2 | 3 | 4 | 5 | 7 |
| k = | −3.0920E+00 | −9.4280E+00 | −5.2731E+01 | −1.3762E+00 | 0.0000E+00 |
| A4 = | 1.3172E−01 | −3.1032E−01 | −3.0555E−01 | −1.0792E−01 | −1.6354E−01 |
| A6 = | −1.5949E−04 | 6.0209E−01 | 6.8298E−01 | 3.9371E−01 | −3.1366E−02 |
| A8 = | −1.1438E−01 | −2.3073E−01 | 2.4003E−01 | 3.8739E−01 | 5.4903E−01 |
| A10 = | 2.6223E−01 | −1.0508E+00 | −2.6527E+00 | −2.4161E+00 | −1.6367E+00 |
| A12 = | −2.4497E−01 | 1.7022E+00 | 3.6649E+00 | 3.5746E+00 | 1.8573E+00 |
| A14 = | 7.1080E−02 | −8.2404E−01 | −1.6642E+00 | −1.7570E+00 | −6.5790E−01 |
| A16 = | — | — | — | — | −1.6949E−01 |

| Surface # | | | | |
|---|---|---|---|---|
| | 8 | 9 | 10 | 11 | 12 |
| k = | 0.0000E+00 | 0.0000E+00 | −1.5109E+01 | −9.9463E−01 | 0.0000E+00 |
| A4 = | −1.9172E−01 | −6.8286E−02 | −5.9684E−02 | −1.5489E−01 | −1.4685E−01 |
| A6 = | 8.7678E−02 | −1.5410E−01 | −5.3927E−02 | 9.2418E−02 | 7.4670E−02 |
| A8 = | −1.5347E−01 | 4.7276E−01 | 2.2627E−01 | −4.3070E−02 | −3.4447E−02 |
| A10 = | 6.2609E−02 | −1.1225E+00 | −4.3969E−01 | 2.4821E−02 | 1.1841E−02 |
| A12 = | 1.1701E−01 | 1.5153E+00 | 4.4583E−01 | −9.8148E−03 | −2.8183E−03 |
| A14 = | −1.8960E−01 | −1.2180E+00 | −2.4442E−01 | 2.2727E−03 | 4.2951E−04 |
| A16 = | 8.1219E−02 | 5.7652E−01 | 7.4106E−02 | −3.0325E−04 | −3.8701E−05 |
| A18 = | — | −1.4568E−01 | −1.1753E−02 | 2.1788E−05 | 1.8266E−06 |
| A20 = | — | 1.4936E−02 | 7.6271E−04 | −6.5546E−07 | −3.3489E−08 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.56 | TD/BL | 7.69 |
| Fno | 2.10 | TL/f | 1.18 |
| HFOV [deg.] | 41.8 | TL/ImgH | 1.28 |
| Nmax | 1.67 | (R9 − R10)/(R9 + R10) | −5.98 |
| V2 | 19.4 | f/|R5| + f/|R6| | 0.10 |
| V3 | 56.0 | f/R7 | 0.21 |
| Vmin | 19.4 | f1/f2 | −0.34 |
| BL/T45 | 0.53 | |f1/f4| | 0.80 |
| CT1/CT2 | 2.62 | |f2/f3| | 0.16 |
| (CT2 + CT3)/T23 | 2.26 | |f3/f5| | 25.68 |
| CT3/CT4 | 1.20 | |f4/f2| | 0.42 |
| T23/CT3 | 0.64 | f4/f5 | −1.72 |
| T45/CT1 | 1.58 | |f5/f1| | 0.72 |
| TD [mm] | 3.71 | Y31/SAG31 + Y32/SAG32 | −13.30 |

7th Embodiment

Figure 13:
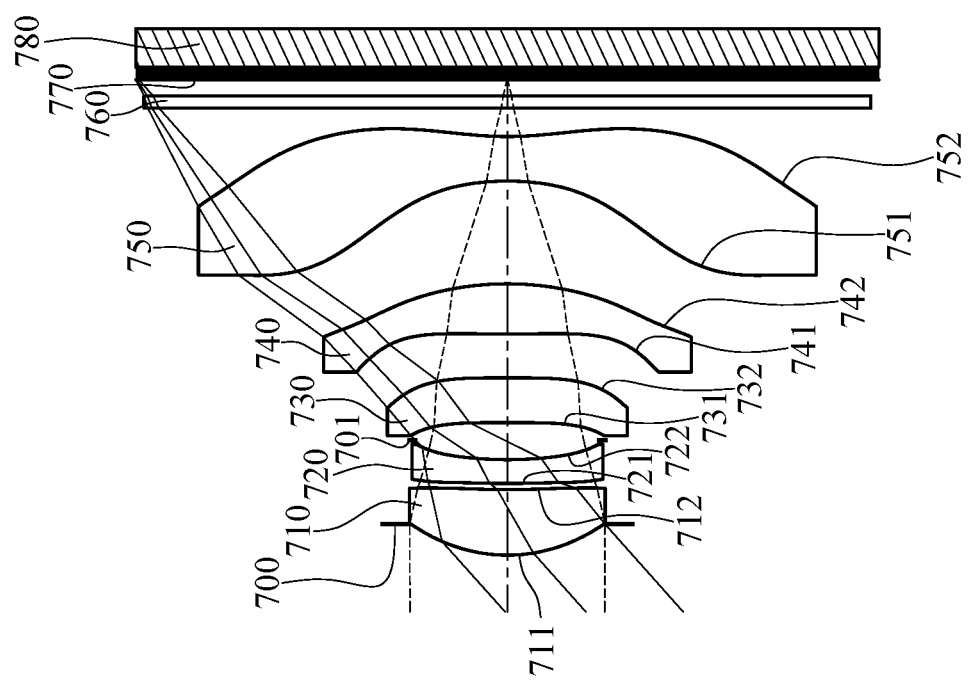
FIG. 13 is a schematic view of an image capturing unit according to the 7th embodiment of the present disclosure.
Figure 14:
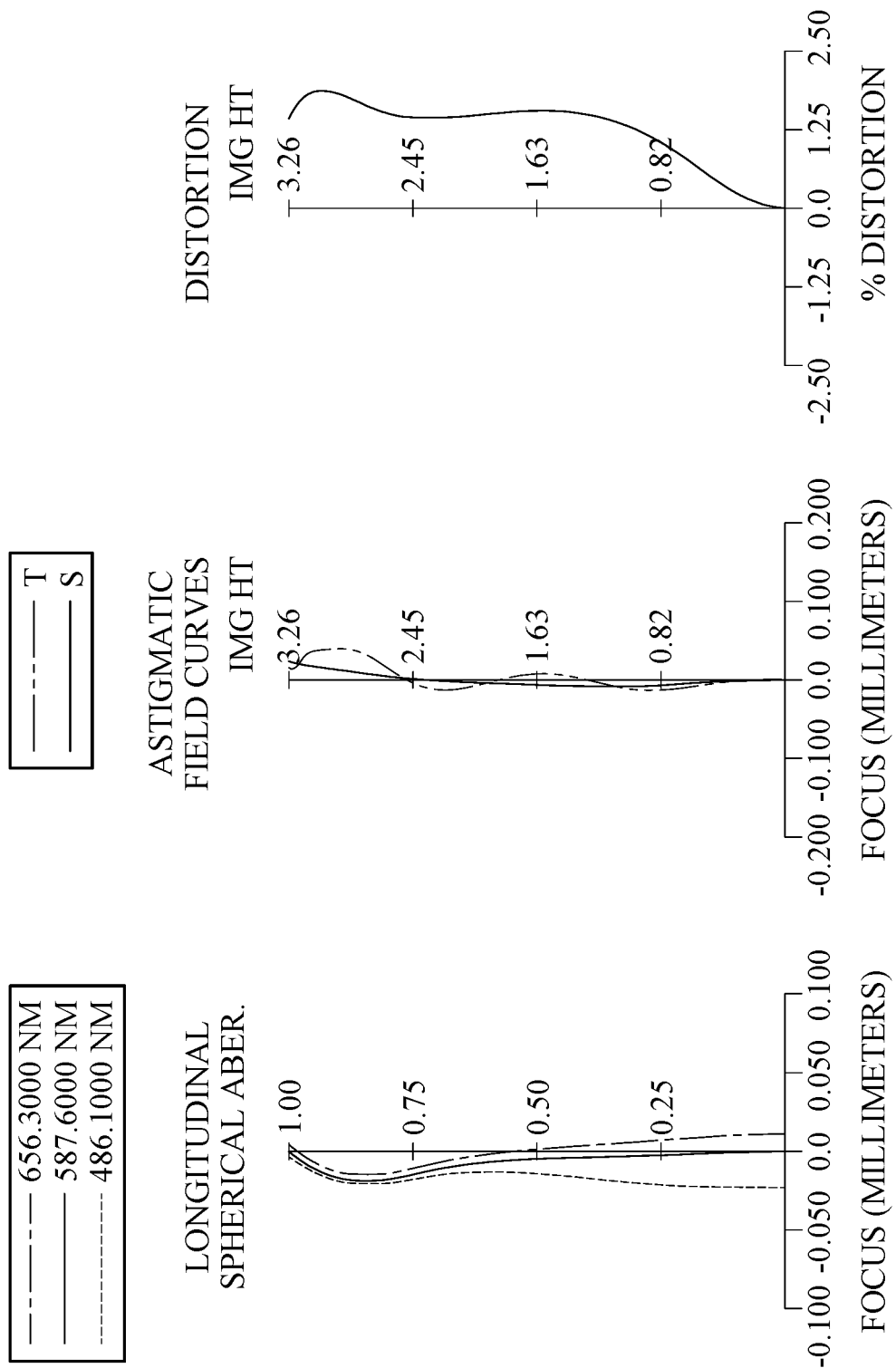
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical system (its reference numeral is omitted) of the present disclosure and an image sensor 780. The photographing optical system includes, in order from an object side to an image side, an aperture stop 700, a first lens element 710, a second lens element 720, a stop 701, a third lens element 730, a fourth lens element 740, a fifth lens element 750, a filter 760 and an image surface 770. The photographing optical system includes five lens elements (710, 720, 730, 740 and 750) with no additional lens element disposed between each of the adjacent five lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. The image-side surface 712 of the first lens element 710 has one inflection point.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric. The object-side surface 721 of the second lens element 720 has two inflection points.

The third lens element 730 with positive refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric. The image-side surface 732 of the third lens element 730 has one inflection point.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric. The object-side surface 741 of the fourth lens element 740 has one inflection point. The image-side surface 742 of the fourth lens element 740 has two inflection points.

The fifth lens element 750 with negative refractive power has an object-side surface 751 being concave in a paraxial region thereof and an image-side surface 752 being concave in a paraxial region thereof. The fifth lens element 750 is made of plastic material and has the object-side surface 751 and the image-side surface 752 being both aspheric. The object-side surface 751 of the fifth lens element 750 has one inflection point. The image-side surface 752 of the fifth lens element 750 has three inflection points. The object-side surface 751 of the fifth lens element 750 has one critical point in an off-axis region thereof. The image-side surface 752 of the fifth lens element 750 has one critical point in an off-axis region thereof.

The filter 760 is made of glass material and located between the fifth lens element 750 and the image surface 770, and will not affect the focal length of the photographing optical system. The image sensor 780 is disposed on or near the image surface 770 of the photographing optical system.

The detailed optical data of the 7th embodiment are shown in Table 13 and the aspheric surface data are shown in Table 14 below.

TABLE 13

7th Embodiment
f = 3.55 mm, Fno = 2.10, HFOV = 41.8 deg.

| Surface # | | Curvature Radius | Thickness | Material | Index | Abbe # | Focal Length |
|---|---|---|---|---|---|---|---|
| 0 | Object | Plano | 350.000 | | | | |
| 1 | Ape. Stop | Plano | −0.274 | | | | |
| 2 | Lens 1 | 1.429 (ASP) | 0.577 | Plastic | 1.545 | 56.1 | 3.49 |
| 3 | | 4.919 (ASP) | 0.055 | | | | |
| 4 | Lens 2 | 6.117 (ASP) | 0.210 | Plastic | 1.669 | 19.4 | −10.70 |
| 5 | | 3.253 (ASP) | 0.170 | | | | |
| 6 | Stop | Plano | 0.157 | | | | |
| 7 | Lens 3 | −200.000 (ASP) | 0.395 | Plastic | 1.544 | 56.0 | 117.98 |
| 8 | | −48.625 (ASP) | 0.387 | | | | |
| 9 | Lens 4 | 19.391 (ASP) | 0.442 | Plastic | 1.544 | 56.0 | 4.15 |

TABLE 13-continued

7th Embodiment
f = 3.55 mm, Fno = 2.10, HFOV = 41.8 deg.

| Surface # | | Curvature Radius | Thickness | Material | Index | Abbe # | Focal Length |
|---|---|---|---|---|---|---|---|
| 10 | | −2.537 (ASP) | 0.905 | | | | |
| 11 | Lens 5 | −2.455 (ASP) | 0.394 | Plastic | 1.534 | 55.9 | −2.47 |
| 12 | | 2.995 (ASP) | 0.250 | | | | |
| 13 | Filter | Plano | 0.110 | Glass | 1.517 | 64.2 | — |
| 14 | | Plano | 0.140 | | | | |
| 15 | Image | Plano | — | | | | |

Note:
Reference wavelength is 587.6 nm (d-line).
An effective radius of the stop 701 (Surface 6) is 0.810 mm.

TABLE 14

Aspheric Coefficients

| Surface # | | | | | |
|---|---|---|---|---|---|
| | 2 | 3 | 4 | 5 | 7 |
| k = | 8.7241E−01 | −3.3450E+00 | −7.0627E+01 | 3.9968E−03 | 0.0000E+00 |
| A4 = | −4.1193E−02 | −2.8922E−01 | −2.9820E−01 | −1.1503E−01 | −2.1415E−01 |
| A6 = | −1.3638E−02 | 3.3955E−01 | 5.3461E−01 | 4.6014E−01 | −5.4606E−02 |
| A8 = | −6.0694E−02 | 6.4088E−01 | 9.4852E−01 | −1.8345E−01 | 8.7537E−01 |
| A10 = | −1.7714E−02 | −2.7360E+00 | −4.2181E+00 | 2.5206E−01 | −3.0693E+00 |
| A12 = | 1.0249E−01 | 3.4050E+00 | 5.3943E+00 | −2.4875E+00 | 4.9461E+00 |
| A14 = | −1.3750E−01 | −1.5323E+00 | −2.4156E+00 | 4.8489E+00 | −4.0351E+00 |
| A16 = | — | — | — | −2.7735E+00 | 1.2942E+00 |

| Surface # | | | | | |
|---|---|---|---|---|---|
| | 8 | 9 | 10 | 11 | 12 |
| k = | 0.0000E+00 | 4.3569E+00 | −9.0871E+00 | −1.0000E+00 | −1.0029E−01 |
| A4 = | −2.1666E−01 | −5.1400E−02 | −2.6523E−02 | −1.4414E−01 | −1.4997E−01 |
| A6 = | 6.0984E−02 | −9.6376E−02 | −6.6310E−02 | 4.7808E−02 | 6.6999E−02 |
| A8 = | 5.1488E−02 | 1.3659E−01 | 1.2167E−01 | 9.8638E−03 | −2.5863E−02 |
| A10 = | −5.1635E−01 | −2.2941E−01 | −1.5847E−01 | −6.1548E−03 | 7.2698E−03 |
| A12 = | 9.7368E−01 | 2.7025E−01 | 1.3064E−01 | 6.0402E−04 | −1.3897E−03 |
| A14 = | −8.4828E−01 | −2.0831E−01 | −5.8498E−02 | 1.4699E−04 | 1.6345E−04 |
| A16 = | 2.8873E−01 | 9.7345E−02 | 1.3398E−02 | −4.2155E−05 | −9.9900E−06 |
| A18 = | — | −2.4152E−02 | −1.3367E−03 | 3.9662E−06 | 1.7848E−07 |
| A20 = | — | 2.4108E−03 | 2.7443E−05 | −1.3491E−07 | 5.2457E−09 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.55 | TD/BL | 7.38 |
| Fno | 2.10 | TL/f | 1.18 |
| HFOV [deg.] | 41.8 | TL/ImgH | 1.28 |
| Nmax | 1.67 | (R9 − R10)/(R9 + R10) | −10.09 |
| V2 | 19.4 | f/|R5| + f/|R6| | 0.09 |
| V3 | 56.0 | f/R7 | 0.18 |
| Vmin | 19.4 | f1/f2 | −0.33 |
| BL/T45 | 0.55 | |f1/f4| | 0.84 |
| CT1/CT2 | 2.75 | |f2/f3| | 0.09 |
| (CT2 + CT3)/T23 | 1.85 | |f3/f5| | 47.85 |
| CT3/CT4 | 0.89 | |f4/f2| | 0.39 |
| T23/CT3 | 0.83 | f4/f5 | −1.68 |
| T45/CT1 | 1.57 | |f5/f1| | 0.71 |
| TD [mm] | 3.69 | Y31/SAG31 + Y32/SAG32 | −11.39 |

8th Embodiment

Figure 15:
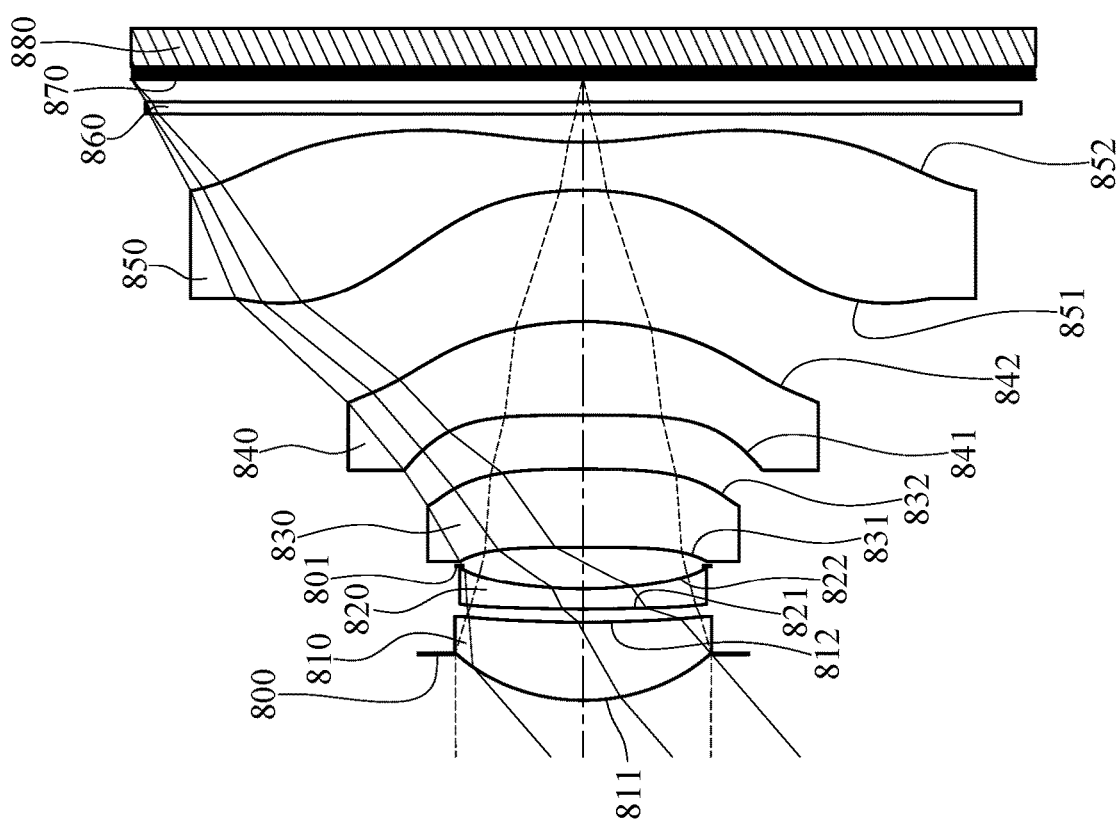
FIG. 15 is a schematic view of an image capturing unit according to the 8th embodiment of the present disclosure.
Figure 16:
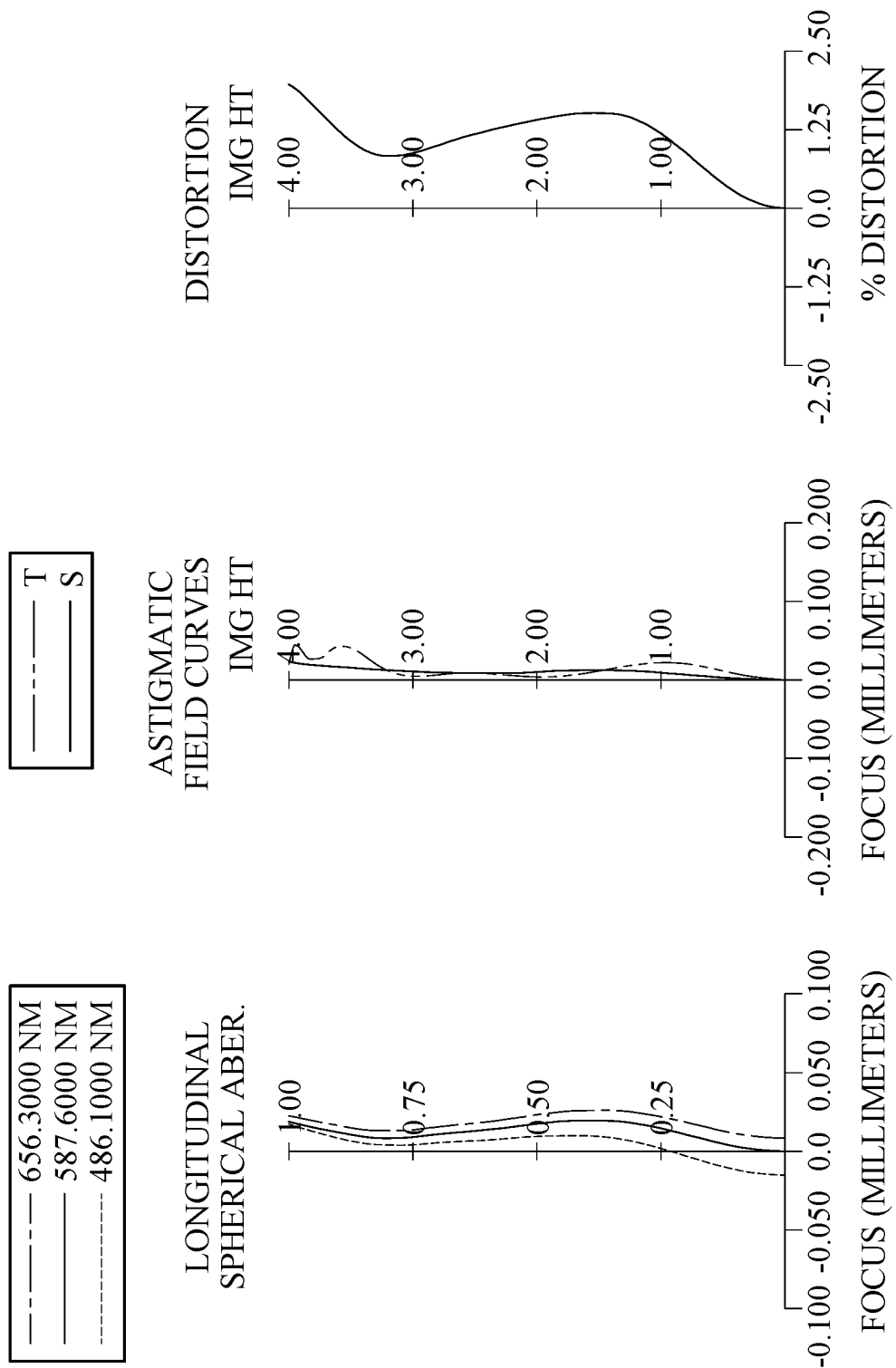
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing optical system (its reference numeral is omitted) of the present disclosure and an image sensor 880. The photographing optical system includes, in order from an object side to an image side, an aperture stop 800, a first lens element 810, a second lens element 820, a stop 801, a third lens element 830, a fourth lens element 840, a fifth lens element 850, a filter 860 and an image surface 870. The photographing optical system includes five lens elements (810, 820, 830, 840 and 850) with no additional lens element disposed between each of the adjacent five lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric. The image-side surface 812 of the first lens element 810 has one inflection point.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric. The object-side surface 821 of the second lens element 820 has two inflection points.

The third lens element 830 with positive refractive power has an object-side surface 831 being planar in a paraxial region thereof and an image-side surface 832 being convex in a paraxial region thereof. The third lens element 830 is made of plastic material and has the object-side surface 831 and the image-side surface 832 being both aspheric. The image-side surface 832 of the third lens element 830 has one inflection point.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric. The image-side surface 842 of the fourth lens element 840 has two inflection points.

The fifth lens element 850 with negative refractive power has an object-side surface 851 being concave in a paraxial region thereof and an image-side surface 852 being concave in a paraxial region thereof. The fifth lens element 850 is made of plastic material and has the object-side surface 851 and the image-side surface 852 being both aspheric. The object-side surface 851 of the fifth lens element 850 has one inflection point. The image-side surface 852 of the fifth lens element 850 has three inflection points. The object-side surface 851 of the fifth lens element 850 has one critical point in an off-axis region thereof. The image-side surface 852 of the fifth lens element 850 has one critical point in an off-axis region thereof.

The filter 860 is made of glass material and located between the fifth lens element 850 and the image surface 870, and will not affect the focal length of the photographing optical system. The image sensor 880 is disposed on or near the image surface 870 of the photographing optical system.

The detailed optical data of the 8th embodiment are shown in Table 15 and the aspheric surface data are shown in Table 16 below.

TABLE 15

8th Embodiment
f = 4.43 mm, Fno = 2.00, HFOV = 40.8 deg.

| Surface # | | Curvature Radius | Thickness | Material | Index | Abbe # | Focal Length |
|---|---|---|---|---|---|---|---|
| 0 | Object | Plano | 350.000 | | | | |
| 1 | Ape. Stop | Plano | −0.412 | | | | |
| 2 | Lens 1 | 1.815 (ASP) | 0.692 | Plastic | 1.545 | 56.1 | 4.05 |
| 3 | | 8.895 (ASP) | 0.116 | | | | |
| 4 | Lens 2 | 8.567 (ASP) | 0.180 | Plastic | 1.688 | 18.7 | −9.45 |
| 5 | | 3.664 (ASP) | 0.205 | | | | |
| 6 | Stop | Plano | 0.165 | | | | |
| 7 | Lens 3 | ∞ (ASP) | 0.691 | Plastic | 1.544 | 56.0 | 26.19 |
| 8 | | −14.251 (ASP) | 0.478 | | | | |
| 9 | Lens 4 | −38.875 (ASP) | 0.828 | Plastic | 1.544 | 56.0 | 5.83 |
| 10 | | −2.954 (ASP) | 1.164 | | | | |
| 11 | Lens 5 | −3.193 (ASP) | 0.426 | Plastic | 1.544 | 56.0 | −3.06 |
| 12 | | 3.637 (ASP) | 0.250 | | | | |
| 13 | Filter | Plano | 0.110 | Glass | 1.517 | 64.2 | — |
| 14 | | Plano | 0.196 | | | | |
| 15 | Image | Plano | — | | | | |

Note:
Reference wavelength is 587.6 nm (d-line).
An effective radius of the stop 801 (Surface 6) is 1.070 mm.

TABLE 16

Aspheric Coefficients

| | Surface # | | | | |
|---|---|---|---|---|---|
| | 2 | 3 | 4 | 5 | 7 |
| k = | 8.4190E−01 | 5.4064E+01 | −6.3988E+01 | −8.8619E+00 | 0.0000E+00 |
| A4 = | −1.3593E−02 | −6.9227E−02 | −1.4251E−01 | −9.2592E−02 | −8.9506E−02 |

TABLE 16-continued

| Aspheric Coefficients | | | | | |
|---|---|---|---|---|---|
| A6 = | −3.4000E−03 | 8.8024E−02 | 2.9312E−01 | 2.6912E−01 | 8.5243E−02 |
| A8 = | 1.2806E−03 | −6.1411E−02 | −2.9316E−01 | −3.2809E−01 | −2.6813E−01 |
| A10 = | −1.2189E−02 | 5.6983E−03 | 1.8238E−01 | 3.2398E−01 | 4.9771E−01 |
| A12 = | 1.2019E−02 | 1.6893E−02 | −6.8471E−02 | −2.4009E−01 | −5.4626E−01 |
| A14 = | −5.1786E−03 | −9.5471E−03 | 1.1876E−02 | 1.0935E−01 | 3.0598E−01 |
| A16 = | — | — | — | −1.8878E−02 | −6.8121E−02 |

| | Surface # | | | | |
|---|---|---|---|---|---|
| | 8 | 9 | 10 | 11 | 12 |
| k = | 0.0000E+00 | 6.0000E+01 | −6.1344E+00 | −1.0437E+00 | −1.3218E−01 |
| A4 = | −5.6718E−02 | −3.1643E−02 | −1.9916E−02 | −6.3853E−02 | −6.3903E−02 |
| A6 = | −6.2399E−02 | −6.1878E−02 | −2.1619E−02 | 4.4361E−03 | 1.2602E−02 |
| A8 = | 1.4280E−01 | 1.0999E−01 | 2.4826E−02 | 9.8785E−03 | −1.7247E−03 |
| A10 = | −1.9518E−01 | −1.7049E−01 | −2.0852E−02 | −3.8875E−03 | 1.5806E−04 |
| A12 = | 1.4818E−01 | 1.6812E−01 | 1.1265E−02 | 7.3571E−04 | −1.2003E−05 |
| A14 = | −5.9986E−02 | −1.0292E−01 | −3.3587E−03 | −8.2046E−05 | 7.7429E−07 |
| A16 = | 1.0219E−02 | 3.7959E−02 | 5.4069E−04 | 5.4879E−06 | −3.0891E−08 |
| A18 = | — | −7.6919E−03 | −4.3834E−05 | −2.0375E−07 | 5.6112E−10 |
| A20 = | — | 6.5628E−04 | 1.3705E−06 | 3.2230E−09 | −5.5522E−12 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 4.43 | TD/BL | 8.89 |
| Fno | 2.00 | TL/f | 1.24 |
| HFOV [deg.] | 40.8 | TL/ImgH | 1.38 |
| Nmax | 1.69 | (R9 − R10)/(R9 + R10) | −15.39 |
| V2 | 18.7 | f/|R5| + f/|R6| | 0.31 |
| V3 | 56.0 | f/R7 | −0.11 |
| Vmin | 18.7 | f1/f2 | −0.43 |
| BL/T45 | 0.48 | |f1/f4| | 0.69 |
| CT1/CT2 | 3.84 | |f2/f3| | 0.36 |
| (CT2 + CT3)/T23 | 2.35 | |f3/f5| | 8.57 |
| CT3/CT4 | 0.83 | |f4/f2| | 0.62 |
| T23/CT3 | 0.54 | f4/f5 | −1.91 |
| T45/CT1 | 1.68 | |f5/f1| | 0.76 |
| TD [mm] | 4.95 | Y31/SAG31 + Y32/SAG32 | −12.92 |

9th Embodiment

Figure 17:
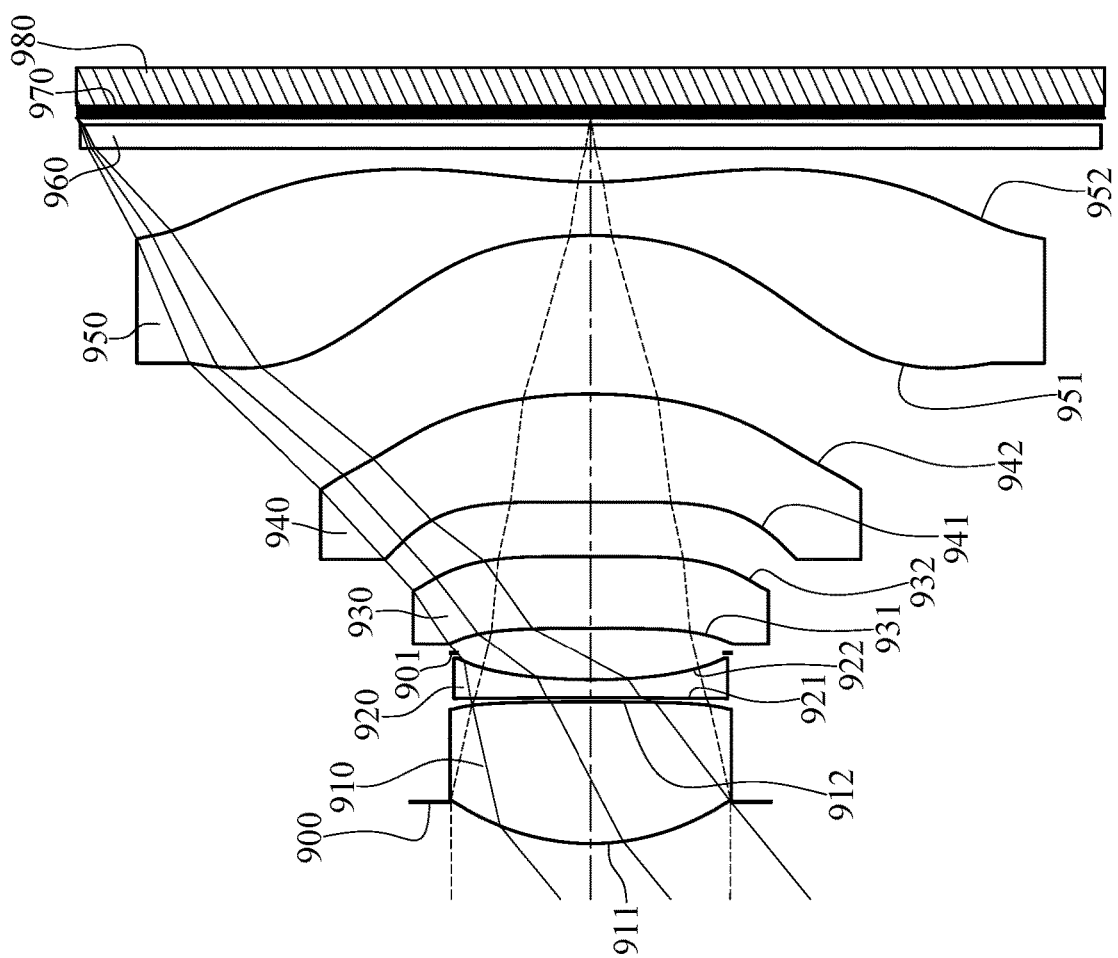
FIG. 17 is a schematic view of an image capturing unit according to the 9th embodiment of the present disclosure.
Figure 18:
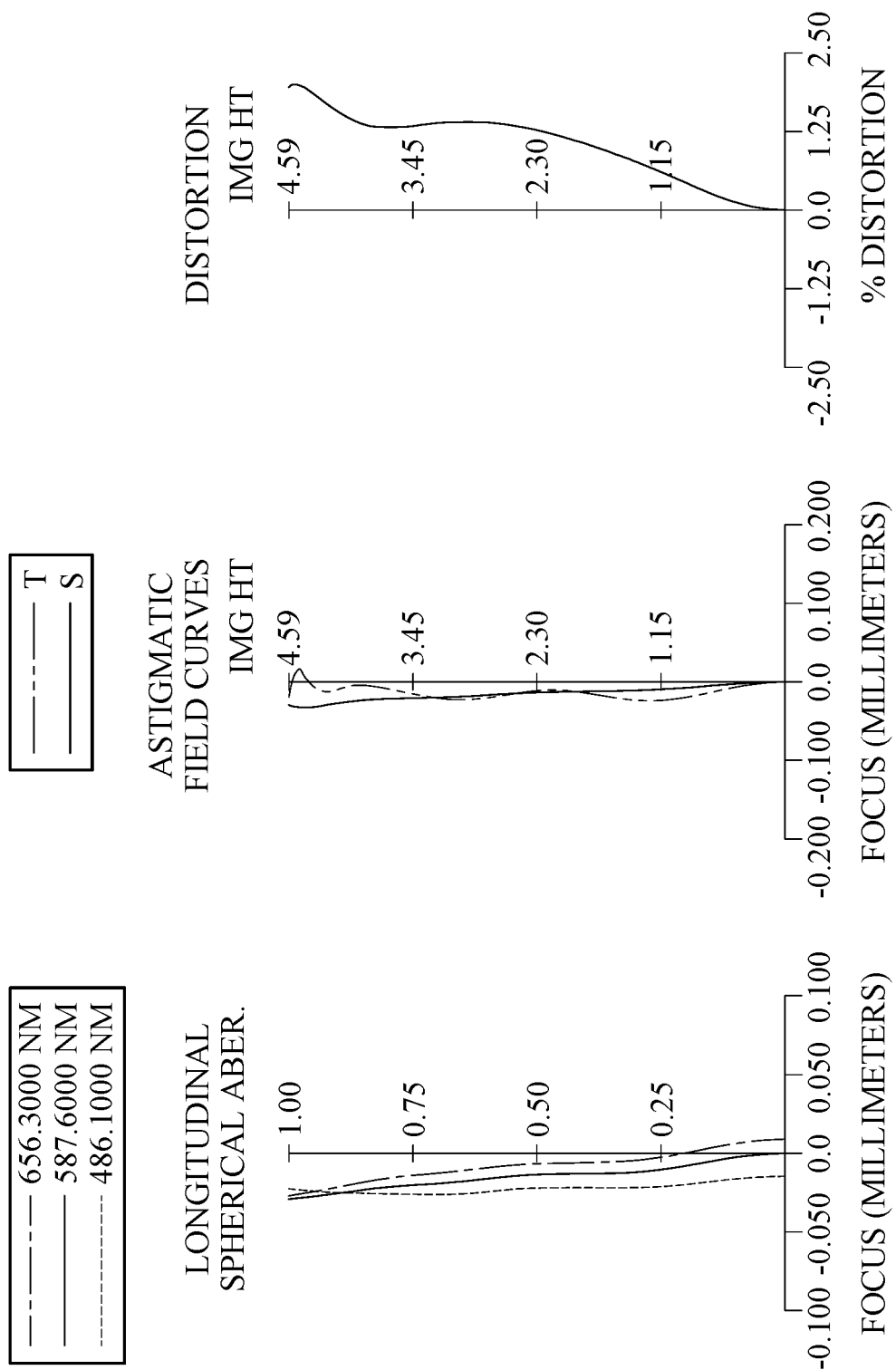
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing optical system (its reference numeral is omitted) of the present disclosure and an image sensor 980. The photographing optical system includes, in order from an object side to an image side, an aperture stop 900, a first lens element 910, a second lens element 920, a stop 901, a third lens element 930, a fourth lens element 940, a fifth lens element 950, a filter 960 and an image surface 970. The photographing optical system includes five lens elements (910, 920, 930, 940 and 950) with no additional lens element disposed between each of the adjacent five lens elements.

The first lens element 910 with positive refractive power has an object-side surface 911 being convex in a paraxial region thereof and an image-side surface 912 being convex in a paraxial region thereof. The first lens element 910 is made of plastic material and has the object-side surface 911 and the image-side surface 912 being both aspheric.

The second lens element 920 with negative refractive power has an object-side surface 921 being concave in a paraxial region thereof and an image-side surface 922 being concave in a paraxial region thereof. The second lens element 920 is made of plastic material and has the object-side surface 921 and the image-side surface 922 being both aspheric. The object-side surface 921 of the second lens element 920 has four inflection points.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric. The object-side surface 931 of the third lens element 930 has two inflection points. The image-side surface 932 of the third lens element 930 has two inflection points.

The fourth lens element 940 with positive refractive power has an object-side surface 941 being convex in a paraxial region thereof and an image-side surface 942 being convex in a paraxial region thereof. The fourth lens element 940 is made of plastic material and has the object-side surface 941 and the image-side surface 942 being both aspheric. The object-side surface 941 of the fourth lens element 940 has two inflection points. The image-side surface 942 of the fourth lens element 940 has two inflection points.

The fifth lens element 950 with negative refractive power has an object-side surface 951 being concave in a paraxial region thereof and an image-side surface 952 being concave in a paraxial region thereof. The fifth lens element 950 is made of plastic material and has the object-side surface 951 and the image-side surface 952 being both aspheric. The object-side surface 951 of the fifth lens element 950 has two inflection points. The image-side surface 952 of the fifth lens element 950 has three inflection points. The object-side surface 951 of the fifth lens element 950 has one critical point in an off-axis region thereof. The image-side surface 952 of the fifth lens element 950 has one critical point in an off-axis region thereof.

The filter 960 is made of glass material and located between the fifth lens element 950 and the image surface 970, and will not affect the focal length of the photographing optical system. The image sensor 980 is disposed on or near the image surface 970 of the photographing optical system.

The detailed optical data of the 9th embodiment are shown in Table 17 and the aspheric surface data are shown in Table 18 below.

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

TABLE 17

9th Embodiment
f = 5.35 mm, Fno = 2.20, HFOV = 39.4 deg.

| Surface # | | Curvature Radius | Thickness | Material | Index | Abbe # | Focal Length |
|---|---|---|---|---|---|---|---|
| 0 | Object | Plano | 350.000 | | | | |
| 1 | Ape. Stop | Plano | −0.375 | | | | |
| 2 | Lens 1 | 2.187 (ASP) | 1.268 | Plastic | 1.545 | 56.1 | 3.96 |
| 3 | | −132.129 (ASP) | 0.038 | | | | |
| 4 | Lens 2 | −200.000 (ASP) | 0.160 | Plastic | 1.650 | 21.8 | −7.79 |
| 5 | | 5.193 (ASP) | 0.241 | | | | |
| 6 | Stop | Plano | 0.223 | | | | |
| 7 | Lens 3 | 179.599 (ASP) | 0.642 | Plastic | 1.566 | 37.4 | −268.41 |
| 8 | | 82.200 (ASP) | 0.487 | | | | |
| 9 | Lens 4 | 37.823 (ASP) | 0.969 | Plastic | 1.544 | 56.0 | 7.24 |
| 10 | | −4.357 (ASP) | 1.425 | | | | |
| 11 | Lens 5 | −3.892 (ASP) | 0.478 | Plastic | 1.544 | 56.0 | −3.73 |
| 12 | | 4.413 (ASP) | 0.300 | | | | |
| 13 | Filter | Plano | 0.210 | Glass | 1.517 | 64.2 | — |
| 14 | | Plano | 0.060 | | | | |
| 15 | Image | Plano | — | | | | |

Note:
Reference wavelength is 587.6 nm (d-line).
An effective radius of the stop 901 (Surface 6) is 1.200 mm.

TABLE 18

Aspheric Coefficients

| | Surface # | | | | |
|---|---|---|---|---|---|
| | 2 | 3 | 4 | 5 | 7 |
| k = | 8.8617E−01 | −9.9000E+01 | −9.9000E+01 | 1.9228E+00 | 2.3691E+01 |
| A4 = | −1.0744E−02 | −9.7891E−02 | −1.1371E−01 | −4.0760E−02 | −5.6848E−02 |
| A6 = | −3.6400E−03 | 3.1895E−01 | 4.2969E−01 | 1.9887E−01 | −9.6853E−03 |
| A8 = | 1.5342E−03 | −5.3777E−01 | −7.0923E−01 | −3.2892E−01 | 7.3164E−02 |
| A10 = | −4.8276E−03 | 4.6040E−01 | 6.0412E−01 | 3.1735E−01 | −1.3540E−01 |
| A12 = | 3.0158E−03 | −1.9921E−01 | −2.5866E−01 | −1.7808E−01 | 1.2135E−01 |
| A14 = | −9.0588E−04 | 3.4076E−02 | 4.3761E−02 | 5.6003E−02 | −5.7692E−02 |
| A16 = | — | — | — | −7.5534E−03 | 1.1529E−02 |

| | Surface # | | | | |
|---|---|---|---|---|---|
| | 8 | 9 | 10 | 11 | 12 |
| k = | 0.0000E+00 | −8.7968E+01 | −6.7331E+00 | −1.0644E+00 | −1.1219E−01 |
| A4 = | −6.3592E−02 | −3.3913E−02 | −1.0404E−02 | −3.9534E−02 | −4.3393E−02 |
| A6 = | 7.4430E−03 | −1.0704E−02 | −7.4739E−03 | 5.1454E−03 | 8.6539E−03 |
| A8 = | 8.3518E−03 | 3.4602E−03 | 7.8861E−04 | 7.6578E−04 | −1.4314E−03 |
| A10 = | −1.6208E−02 | −9.7821E−07 | 1.6894E−04 | −1.9549E−04 | 1.7394E−04 |
| A12 = | 1.1373E−02 | −5.0504E−04 | −1.2008E−03 | 1.2289E−05 | −1.4692E−05 |
| A14 = | −4.1037E−03 | −1.1257E−05 | 4.3095E−04 | 3.7661E−07 | 7.7510E−07 |
| A16 = | 6.2252E−04 | 1.4580E−04 | −8.4089E−05 | −9.1150E−08 | −2.1555E−08 |
| A18 = | — | −5.3722E−05 | 8.3389E−06 | 4.6831E−09 | 1.9864E−10 |
| A20 = | — | 6.2618E−06 | −3.2991E−07 | −8.4600E−11 | 1.4119E−12 |

| 9th Embodiment | | | |
|---|---|---|---|
| f [mm] | 5.35 | TD/BL | 10.40 |
| Fno | 2.20 | TL/f | 1.22 |
| HFOV [deg.] | 39.4 | TL/ImgH | 1.41 |
| Nmax | 1.65 | (R9 − R10)/(R9 + R10) | −15.94 |
| V2 | 21.8 | f/|R5| + f/|R6| | 0.09 |
| V3 | 37.4 | f/R7 | 0.14 |
| Vmin | 21.8 | f1/f2 | −0.51 |
| BL/T45 | 0.40 | |f1/f4| | 0.55 |
| CT1/CT2 | 7.93 | |f2/f3| | 0.03 |
| (CT2 + CT3)/T23 | 1.73 | |f3/f5| | 72.04 |
| CT3/CT4 | 0.66 | |f4/f2| | 0.93 |
| T23/CT3 | 0.72 | f4/f5 | −1.94 |
| T45/CT1 | 1.12 | |f5/f1| | 0.94 |
| TD [mm] | 5.93 | Y31/SAG31 + Y32/SAG32 | −14.23 |

10th Embodiment

Figure 19:
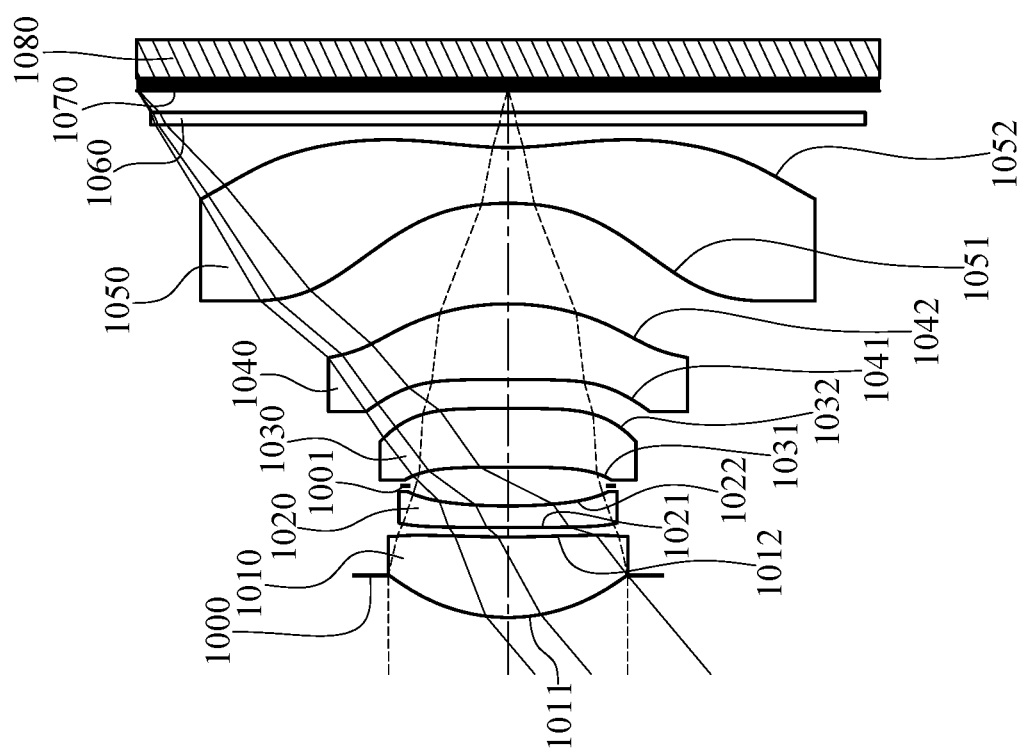
FIG. 19 is a schematic view of an image capturing unit according to the 10th embodiment of the present disclosure.
Figure 20:
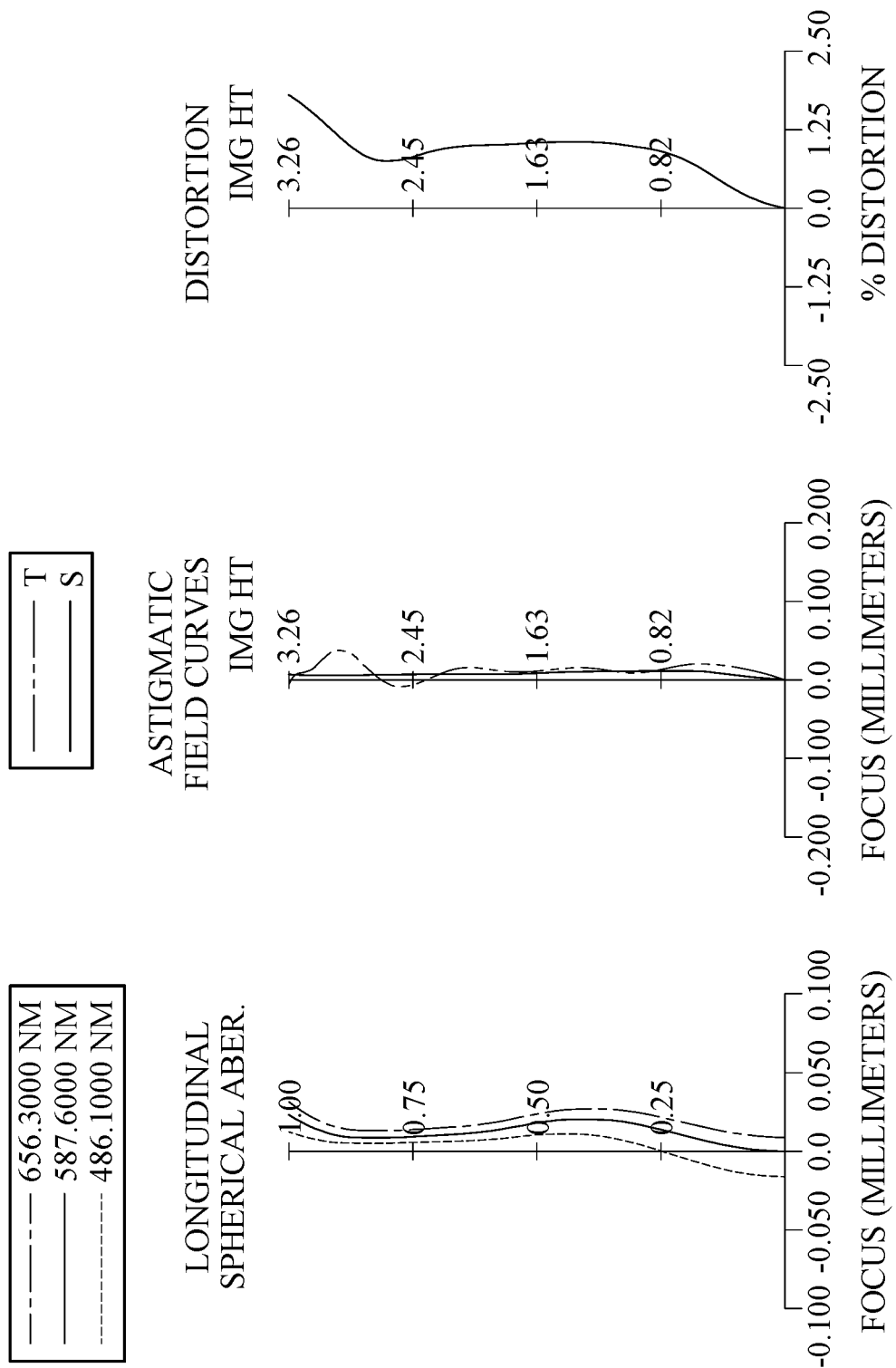
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the photographing optical system (its reference numeral is omitted) of the present disclosure and an image sensor 1080. The photographing optical system includes, in order from an object side to an image side, an aperture stop 1000, a first lens element 1010, a second lens element 1020, a stop 1001, a third lens element 1030, a fourth lens element 1040, a fifth lens element 1050, a filter 1060 and an image surface 1070. The photographing optical system includes five lens elements (1010, 1020, 1030, 1040 and 1050) with no additional lens element disposed between each of the adjacent five lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric. The object-side surface 1011 of the first lens element 1010 has one inflection point. The image-side surface 1012 of the first lens element 1010 has one inflection point.

The second lens element 1020 with negative refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric. The object-side surface 1021 of the second lens element 1020 has two inflection points.

The third lens element 1030 has an object-side surface 1031 being planar in a paraxial region thereof and an image-side surface 1032 being planar in a paraxial region thereof. The third lens element 1030 is made of plastic material and has the object-side surface 1031 and the image-side surface 1032 being both aspheric. The image-side surface 1032 of the third lens element 1030 has one inflection point.

The fourth lens element 1040 with positive refractive power has an object-side surface 1041 being concave in a paraxial region thereof and an image-side surface 1042 being convex in a paraxial region thereof. The fourth lens element 1040 is made of plastic material and has the object-side surface 1041 and the image-side surface 1042 being both aspheric. The image-side surface 1042 of the fourth lens element 1040 has one inflection point.

The fifth lens element 1050 with negative refractive power has an object-side surface 1051 being concave in a paraxial region thereof and an image-side surface 1052 being concave in a paraxial region thereof. The fifth lens element 1050 is made of plastic material and has the object-side surface 1051 and the image-side surface 1052 being both aspheric. The object-side surface 1051 of the fifth lens element 1050 has one inflection point. The image-side surface 1052 of the fifth lens element 1050 has two inflection points. The image-side surface 1052 of the fifth lens element 1050 has one critical point in an off-axis region thereof.

The filter 1060 is made of glass material and located between the fifth lens element 1050 and the image surface 1070, and will not affect the focal length of the photographing optical system. The image sensor 1080 is disposed on or near the image surface 1070 of the photographing optical system.

The detailed optical data of the 10th embodiment are shown in Table 19 and the aspheric surface data are shown in Table 20 below.

TABLE 19

10th Embodiment
f = 3.74 mm, Fno = 1.80, HFOV = 40.1 deg.

| Surface # | | Curvature Radius | Thickness | Material | Index | Abbe # | Focal Length |
|---|---|---|---|---|---|---|---|
| 0 | Object | Plano | 450.000 | | | | |
| 1 | Ape. Stop | Plano | −0.369 | | | | |
| 2 | Lens 1 | 1.617 (ASP) | 0.710 | Plastic | 1.560 | 58.0 | 3.48 |
| 3 | | 7.970 (ASP) | 0.083 | | | | |
| 4 | Lens 2 | 13.306 (ASP) | 0.190 | Plastic | 1.680 | 18.4 | −9.80 |
| 5 | | 4.415 (ASP) | 0.177 | | | | |
| 6 | Stop | Plano | 0.165 | | | | |
| 7 | Lens 3 | ∞ (ASP) | 0.518 | Plastic | 1.560 | 58.0 | ∞ |
| 8 | | ∞ (ASP) | 0.255 | | | | |
| 9 | Lens 4 | −130.538 (ASP) | 0.668 | Plastic | 1.560 | 58.0 | 3.97 |
| 10 | | −2.190 (ASP) | 0.887 | | | | |
| 11 | Lens 5 | −2.488 (ASP) | 0.491 | Plastic | 1.560 | 58.0 | −2.36 |
| 12 | | 3.032 (ASP) | 0.200 | | | | |
| 13 | Filter | Plano | 0.110 | Glass | 1.517 | 64.2 | — |

TABLE 19-continued

10th Embodiment
f = 3.74 mm, Fno = 1.80, HFOV = 40.1 deg.

| Surface # | | Curvature Radius | Thickness | Material | Index | Abbe # | Focal Length |
|---|---|---|---|---|---|---|---|
| 14 | | Plano | 0.191 | | | | |
| 15 | Image | Plano | — | | | | |

Note:
Reference wavelength is 587.6 nm (d-line).
An effective radius of the stop 1001 (Surface 6) is 0.880 mm.
An effective radius of the object-side surface 1041 (Surface 9) is 1.250 mm.

TABLE 20

Aspheric Coefficients

| | | | Surface # | | |
|---|---|---|---|---|---|
| | 2 | 3 | 4 | 5 | 7 |
| k = | 6.9616E−01 | 3.4917E+01 | 2.2215E+01 | −6.8458E+00 | 0.0000E+00 |
| A4 = | −1.9078E−02 | −1.1717E−01 | −1.6880E−01 | −6.8543E−02 | −1.4152E−01 |
| A6 = | −2.9282E−02 | 5.6148E−02 | 3.4103E−01 | 2.8502E−01 | −5.7444E−03 |
| A8 = | 5.8479E−02 | 2.3711E−01 | −1.6431E−02 | −9.1783E−02 | 7.2345E−02 |
| A10 = | −1.2389E−01 | −5.9676E−01 | −5.9497E−01 | −1.9824E−01 | −2.4549E−01 |
| A12 = | 1.0518E−01 | 5.1402E−01 | 7.1485E−01 | 5.4416E−02 | 2.7955E−01 |
| A14 = | −4.2398E−02 | −1.6482E−01 | −2.6695E−01 | 3.3371E−01 | −2.3143E−01 |
| A16 = | — | — | — | −2.2108E−01 | 9.1596E−02 |

| | | | Surface # | | |
|---|---|---|---|---|---|
| | 8 | 9 | 10 | 11 | 12 |
| k = | 0.0000E+00 | 6.0000E+01 | −8.1229E+00 | −9.7374E−01 | −9.4579E−02 |
| A4 = | −1.2019E−01 | −7.0037E−02 | −6.7513E−02 | −1.5269E−01 | −1.5607E−01 |
| A6 = | −2.2827E−01 | −1.0636E−01 | −1.0053E−01 | 7.4803E−02 | 8.3411E−02 |
| A8 = | 6.9411E−01 | 7.3456E−02 | 3.3493E−01 | −4.5197E−03 | −3.8499E−02 |
| A10 = | −1.3141E+00 | 6.0668E−02 | −5.2542E−01 | −8.4470E−03 | 1.3222E−02 |
| A12 = | 1.3773E+00 | −3.2099E−01 | 4.6980E−01 | 4.6878E−03 | −3.1476E−03 |
| A14 = | −7.5478E−01 | 4.6266E−01 | −2.3881E−01 | −1.2923E−03 | 4.8844E−04 |
| A16 = | 1.6976E−01 | −3.0441E−01 | 6.8623E−02 | 2.0036E−04 | −4.6580E−05 |
| A18 = | — | 9.3847E−02 | −1.0425E−02 | −1.6464E−05 | 2.4704E−06 |
| A20 = | — | −1.0913E−02 | 6.5249E−04 | 5.5682E−07 | −5.5817E−08 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 3.74 | TD/BL | 8.27 |
| Fno | 1.80 | TL/f | 1.24 |
| HFOV [deg.] | 40.1 | TL/ImgH | 1.42 |
| Nmax | 1.68 | (R9 − R10)/(R9 + R10) | −10.16 |
| V2 | 18.4 | f/|R5| + f/|R6| | 0.00 |
| V3 | 58.0 | f/R7 | −0.03 |
| Vmin | 18.4 | f1/f2 | −0.36 |
| BL/T45 | 0.57 | |f1/f4| | 0.88 |
| CT1/CT2 | 3.74 | |f2/f3| | 0.00 |
| (CT2 + CT3)/T23 | 2.07 | |f3/f5| | ∞ |
| CT3/CT4 | 0.78 | |f4/f2| | 0.41 |
| T23/CT3 | 0.66 | f4/f5 | −1.68 |
| T45/CT1 | 1.25 | |f5/f1| | 0.68 |
| TD [mm] | 4.14 | Y31/SAG31 + Y32/SAG32 | −11.82 |

11th Embodiment

Figure 21:
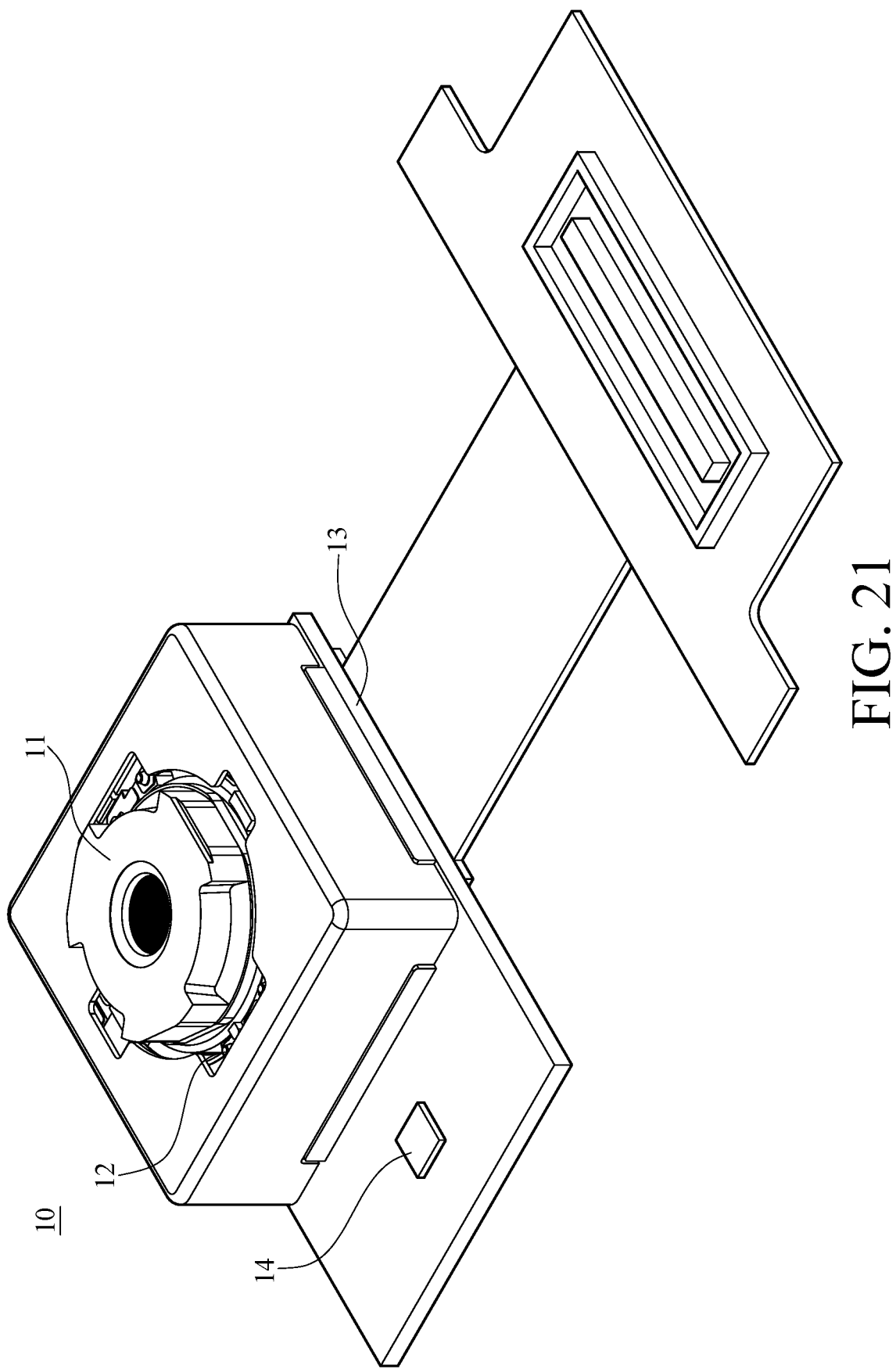
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 10 is a camera module including a lens unit 11, a driving device 12, an image sensor 13 and an image stabilizer 14. The lens unit 11 includes the photographing optical system disclosed in the 1st embodiment, a barrel and a holder member (their reference numerals are omitted) for holding the photographing optical system. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the photographing optical system to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

12th Embodiment

Figure 22:
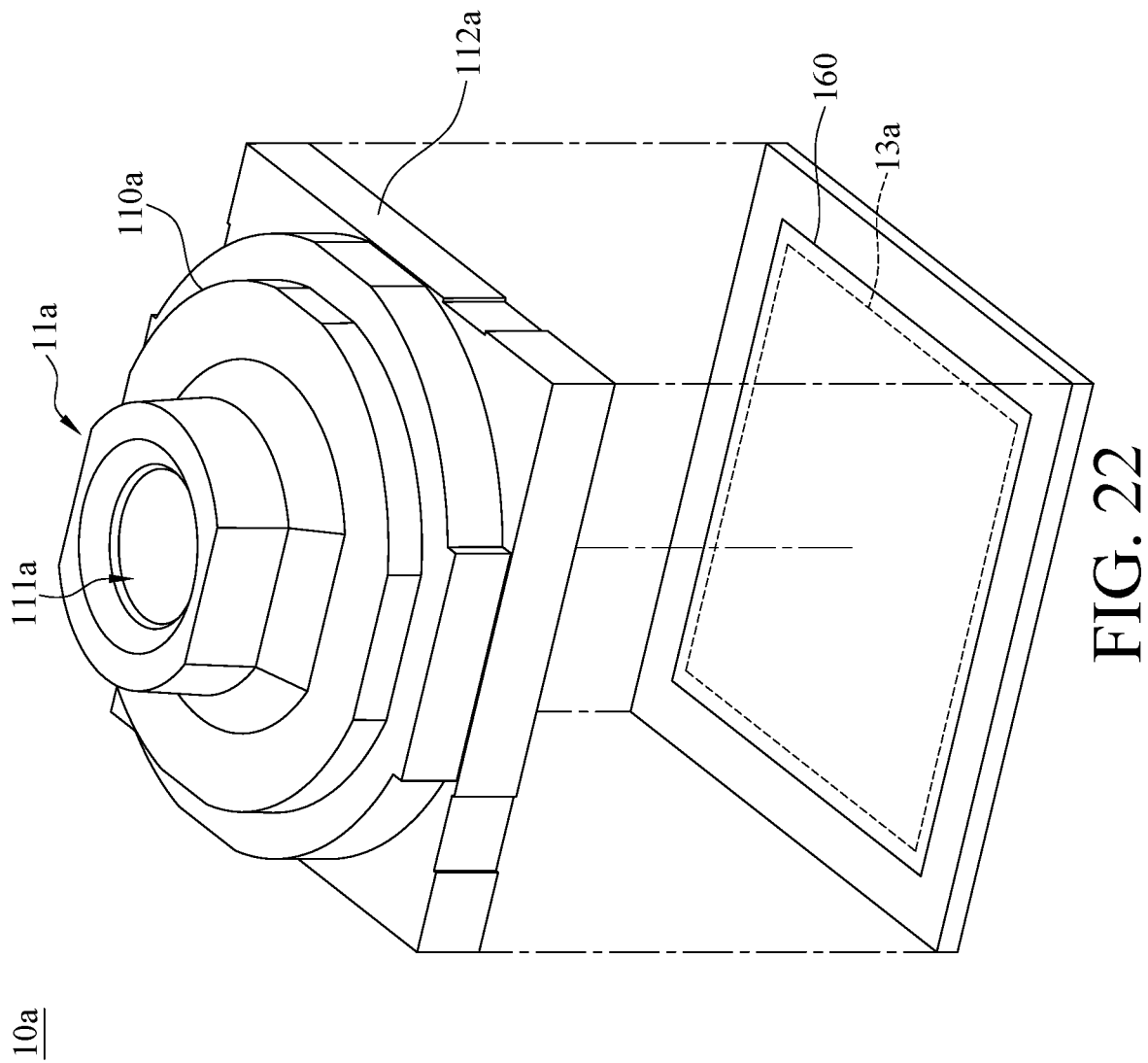
FIG. 22 is a perspective view of an image capturing unit according to the 12th embodiment of the present disclosure.
Figure 23:
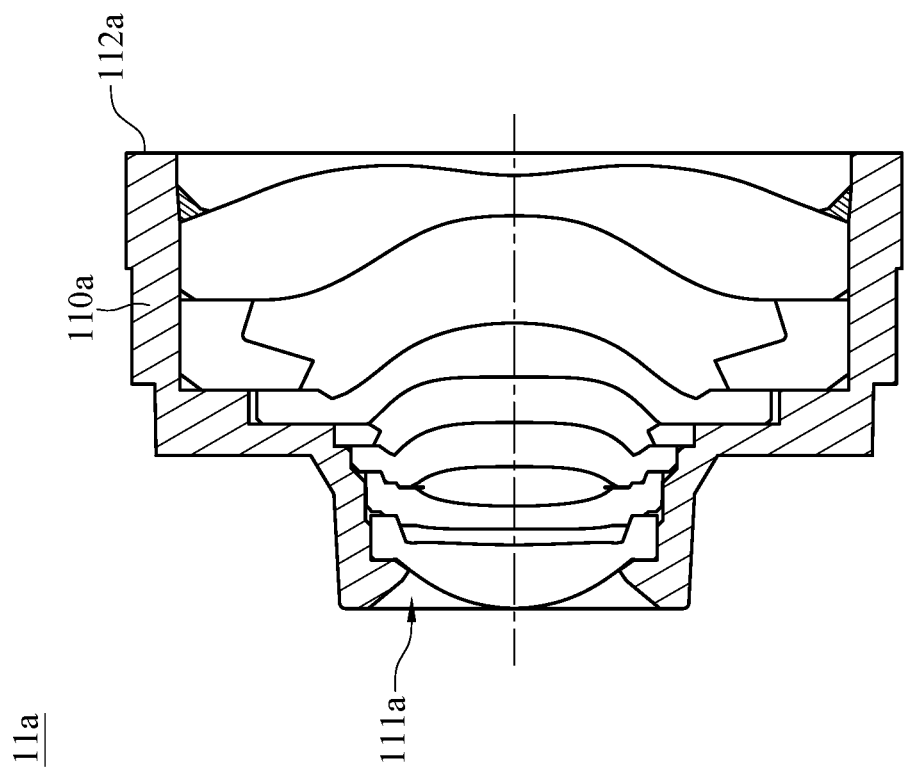
FIG. 23 is a partial cross-sectional view of the image capturing unit in FIG. 22.

FIG. 22 is a perspective view of an image capturing unit according to the 12th embodiment of the present disclosure. FIG. 23 is a partial cross-sectional view of the image capturing unit in FIG. 22. In this embodiment, an image capturing unit 10a is a camera module including a lens unit 11a and an image sensor 13a. The lens unit 11a includes the photographing optical system disclosed in the 1st embodiment and a barrel 110a for holding the photographing optical system. The photographing optical system is disposed in the barrel 110a. In this embodiment, the barrel 110a is an integrated barrel. The barrel 110a has an object-side opening 111a having a circular structure as an aperture stop of the photographing optical system; furthermore, an image side of the barrel has a rectangular structure, which can be directly assembled with the filter 160 or the image sensor 13a.

In this embodiment, when a plane perpendicular to the optical axis passes through a barrel, there are at least two sets of parallel lines at the intersection of the plane and the barrel, and each set of parallel lines consists of at least two straight lines parallel to each other. When the two sets of parallel lines are perpendicular to each other, it means that the barrel has a rectangular structure. It is specified that the relations such as parallel or perpendicular conformations and the configurations such as straight lines or planes of a barrel are design considerations, and tolerances such as manufacturing tolerances are not taken into consideration. When an image side of the barrel has a rectangular structure, the shapes of the barrel and the image sensor match with each other so as to achieve better space utilization. Moreover, when an object-side opening of the barrel has a circular structure, it is favorable for reducing misalignment problems such as decentering and tilting during assembling.

13th Embodiment

Figure 24:
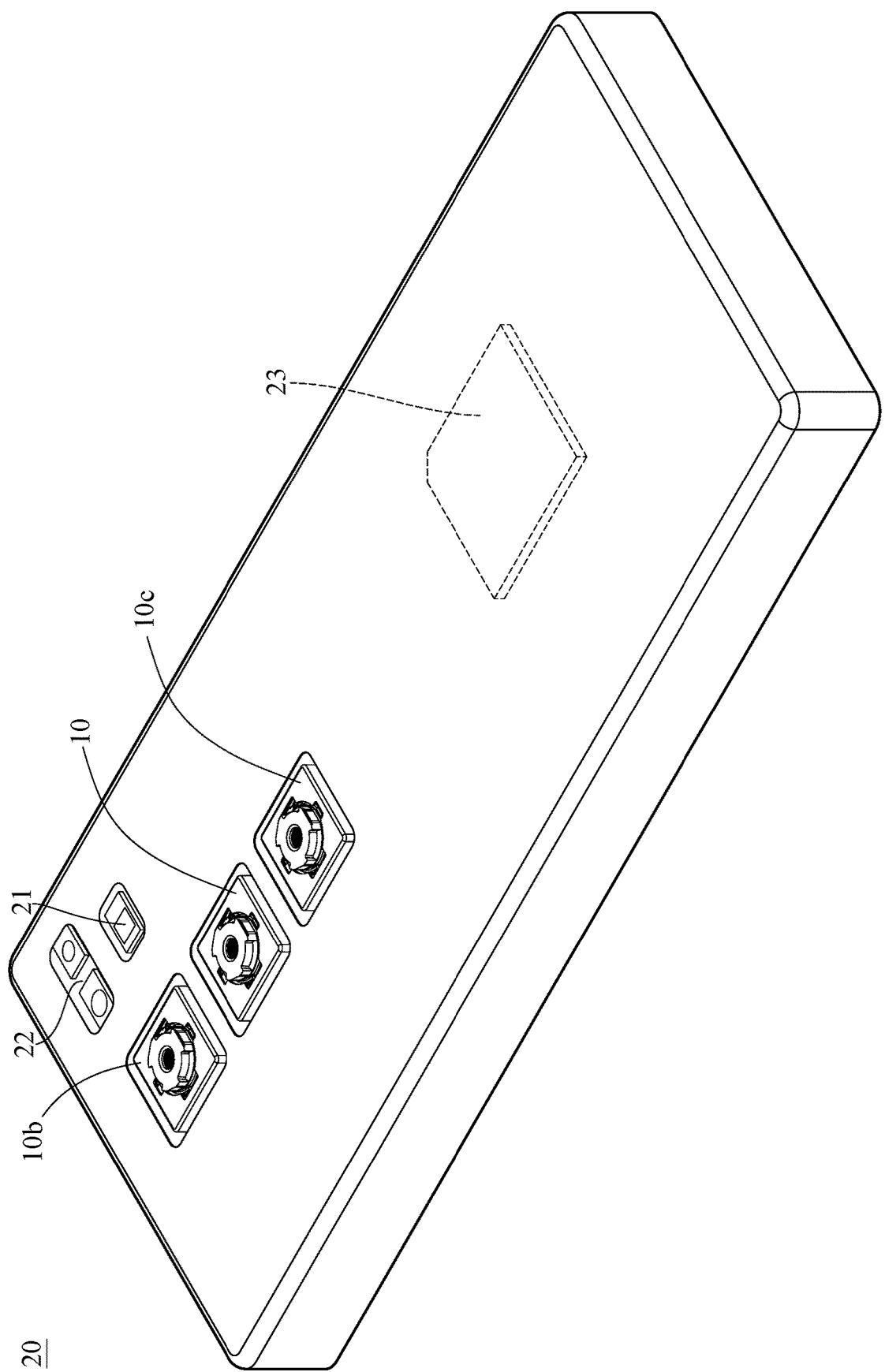
FIG. 24 is one perspective view of an electronic device according to the 13th embodiment of the present disclosure.
Figure 25:
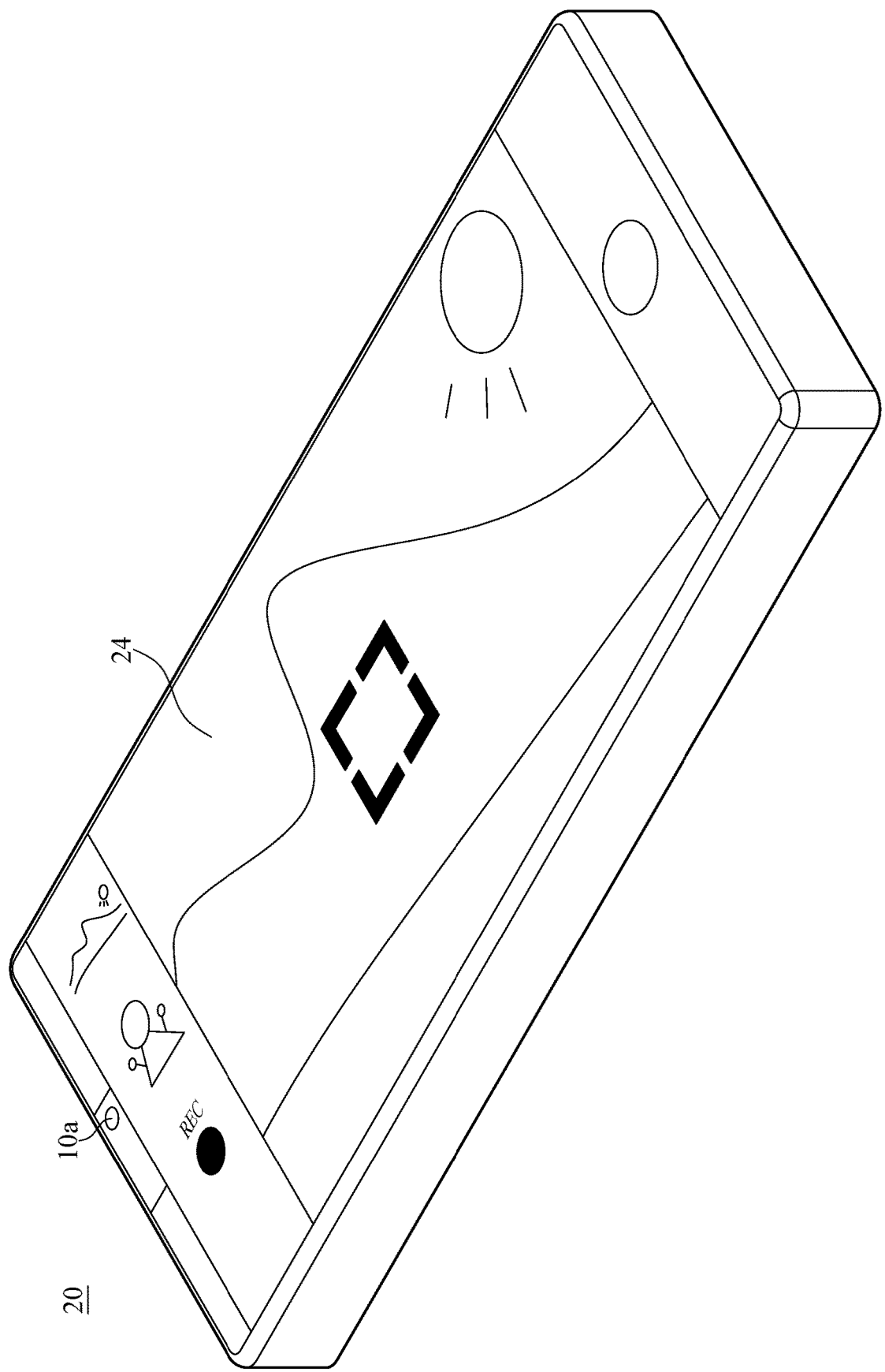
FIG. 25 is another perspective view of the electronic device in FIG. 24.
Figure 26:
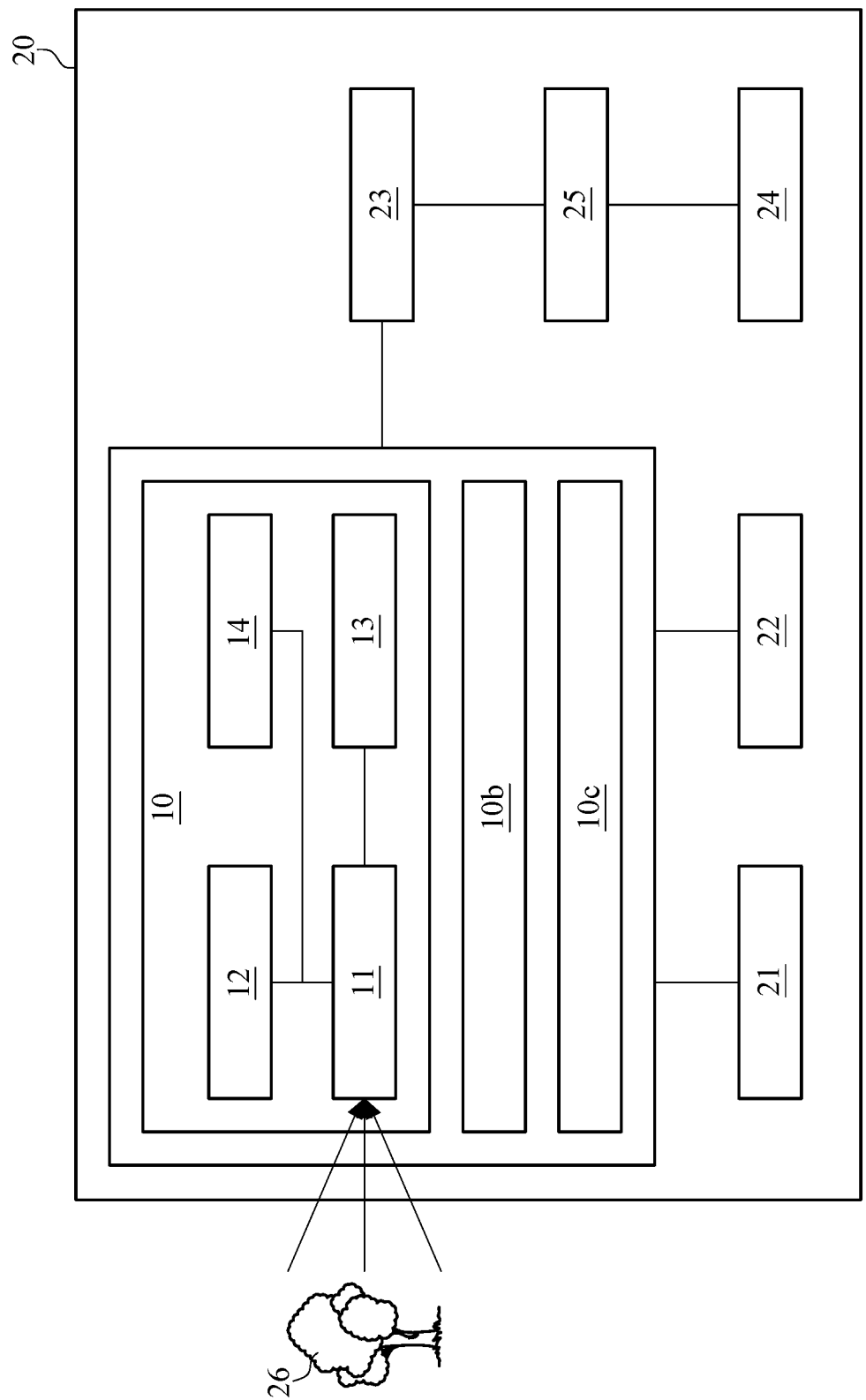
FIG. 26 is a block diagram of the electronic device in FIG. 24.

FIG. 24 is one perspective view of an electronic device according to the 13th embodiment of the present disclosure. FIG. 25 is another perspective view of the electronic device in FIG. 24. FIG. 26 is a block diagram of the electronic device in FIG. 24.

In this embodiment, an electronic device 20 is a smartphone including the image capturing unit 10 disclosed in the 11th embodiment, the image capturing unit 10a disclosed in the 12th embodiment, an image capturing unit 10b, an image capturing unit 10c, a flash module 21, a focus assist module 22, an image signal processor 23, a user interface 24 and an image software processor 25. The image capturing unit 10a is located on the same side as the user interface 24, and the image capturing unit 10, the image capturing unit 10b and the image capturing unit 10c are located on the opposite side. The image capturing unit 10, the image capturing unit 10b and the image capturing unit 10c all face the same direction, and each of the image capturing units 10, 10b and 10c has a single focal point. Furthermore, the image capturing unit 10b and the image capturing unit 10c both have a configuration similar to that of the image capturing unit 10. In detail, each of the image capturing unit 10b and the image capturing unit 10c includes a lens unit, a driving device, an image sensor and an image stabilizer, and the lens unit includes a lens system, a barrel and a holder member for holding the lens system.

In this embodiment, the image capturing units 10, 10b, 10c have different fields of view (e.g., the image capturing unit 10b is a telephoto image capturing unit, the image capturing unit 10c is a wide-angle image capturing unit and the image capturing unit 10 has a field of view ranging between that of the image capturing unit 10b and the image capturing unit 10c), such that the electronic device 20 has various magnification ratios so as to meet the requirement of optical zoom functionality. In this embodiment, the electronic device 20 includes multiple image capturing units 10, 10a, 10b and 10c, but the present disclosure is not limited to the number and arrangement of image capturing units.

When a user captures images of an object 26, the light rays converge in the image capturing unit 10, the image capturing unit 10b or the image capturing unit 10c to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. In addition, the electronic device 20 can capture images of the object 26 via the image capturing unit 10a. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing units 10 and 10a of the present disclosure installed in an electronic device, and the present disclosure is not limited thereto. The image capturing units 10 and 10a can be optionally applied to optical systems with a movable focus. Furthermore, the photographing optical system of the image capturing units 10 and 10a features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical system comprising five lens elements, the five lens elements being, in order from an object side to an image side, a first lens element, a second lens element, a third lens element, a fourth lens element and a fifth lens element, and each of the five lens elements having an object-side surface facing toward the object side and an image-side surface facing toward the image side;

wherein the second lens element has negative refractive power, the fifth lens element has negative refractive power, the image-side surface of the fifth lens element is concave in an on-axis region thereof, and the image-side surface of the fifth lens element is aspheric and has at least one inflection point;

wherein an axial distance between the image-side surface of the fifth lens element and an image surface is BL, an axial distance between the second lens element and the third lens element is T23, an axial distance between the fourth lens element and the fifth lens element is T45, a central thickness of the second lens element is CT2, a central thickness of the third lens element is CT3, an axial distance between the object-side surface of the first lens element and the image-side surface of the fifth lens element is TD, a focal length of the first lens element is f1, a focal length of the third lens element is f3, a focal length of the fifth lens element is f5, an f-number of the photographing optical system is Fno, and the following conditions are satisfied:

$BL/T45<1.0$;

$0<(CT2+CT3)/T23<5.8$;

$6.5<TD/BL$;

$5.2<|f3/f5|$;

$1.00<Fno<2.60$; and $|f5/f1|<1.0$.

2. The photographing optical system of claim 1, wherein the axial distance between the image-side surface of the fifth lens element and the image surface is BL, the axial distance between the fourth lens element and the fifth lens element is T45, a focal length of the first lens element is f1, a focal length of the second lens element is f2, the focal length of the third lens element is f3, a focal length of the fourth lens element is f4, and the following conditions are satisfied:

$0.20<BL/T45<0.80$;

$|f1/f4|<1.0$;

$|f2/f3|<1.0$; and $|f4/f2|<1.0$.

3. The photographing optical system of claim 1, wherein the central thickness of the second lens element is CT2, the central thickness of the third lens element is CT3, the axial distance between the second lens element and the third lens element is T23, a focal length of the photographing optical system is f, a curvature radius of the object-side surface of the third lens element is R5, a curvature radius of the image-side surface of the third lens element is R6, and the following conditions are satisfied:

$1.6<(CT2+CT3)/T23<3.0$; and $f/|R5|+f/|R6|<0.80$.

4. The photographing optical system of claim 1, wherein the focal length of the third lens element is f3, the focal length of the fifth lens element is f5, the f-number of the photographing optical system is Fno, and the following conditions are satisfied:

$6.3<|f3/f5|$; and $1.40<Fno<2.40$.

5. The photographing optical system of claim 1, wherein the axial distance between the object-side surface of the first lens element and the image-side surface of the fifth lens element is TD, an axial distance between the object-side surface of the first lens element and the image surface is TL, a maximum image height of the photographing optical system is ImgH, half of a maximum field of view of the photographing optical system is HFOV, and the following conditions are satisfied:

$1.0\ [\text{mm}]<TD<7.0\ [\text{mm}]$;

$0.80<TL/ImgH<1.50$; and $30.0\ [\text{deg.}]<HFOV<50.0\ [\text{deg.}]$.

6. The photographing optical system of claim 1, wherein the first lens element has positive refractive power, the object-side surface of the first lens element is convex in an on-axis region thereof, the image-side surface of the second lens element is concave in an on-axis region thereof, the fourth lens element has positive refractive power, and the image-side surface of the fourth lens element is convex in an on-axis region thereof;

wherein a maximum effective radius of the object-side surface of the third lens element is Y31, a maximum effective radius of the image-side surface of the third lens element is Y32, a displacement in parallel with an optical axis from an axial vertex of the object-side surface of the third lens element to a maximum effective radius position of the object-side surface of the third lens element is SAG31, a displacement in parallel with the optical axis from an axial vertex of the image-side surface of the third lens element to a maximum effective radius position of the image-side surface of the third lens element is SAG32, and the following condition is satisfied:

$-20.0<Y31/SAG31+Y32/SAG32<-5.0$;

wherein when the direction from the axial vertex of one surface to the maximum effective radius position of the same surface is facing towards the image side of the photographing optical system, the value of displacement is positive; when the direction from the axial vertex of the surface to the maximum effective radius position of the same surface is facing towards the object side of the photographing optical system, the value of displacement is negative.

7. A photographing optical system comprising five lens elements, the five lens elements being, in order from an object side to an image side, a first lens element, a second lens element, a third lens element, a fourth lens element and a fifth lens element, and each of the five lens elements having an object-side surface facing toward the object side and an image-side surface facing toward the image side;

wherein the second lens element has negative refractive power, the fifth lens element has negative refractive power, and at least one of the five lens elements has at least one aspheric surface having at least one inflection point;

wherein an axial distance between the image-side surface of the fifth lens element and an image surface is BL, an axial distance between the second lens element and the third lens element is T23, an axial distance between the fourth lens element and the fifth lens element is T45, a central thickness of the second lens element is CT2, a central thickness of the third lens element is CT3, an axial distance between the object-side surface of the first lens element and the image-side surface of the fifth lens element is TD, a focal length of the first lens element is f1, a focal length of the third lens element is f3, a focal length of the fifth lens element is f5, an f-number of the photographing optical system is Fno, a minimum value among Abbe numbers of all lens elements of the photographing optical system is Vmin, and the following conditions are satisfied:

$BL/T45<1.0$;

$0.45<(CT2+CT3)/T23<5.8$;

$3.9<TD/BL$;

$3.8<|f3/f5|$;

$1.00<Fno<2.60$;

$10.0<Vmin<22.0$;

$|f5/f1|<1.0$; and $0.45<T23/CT3<1.0$.

8. The photographing optical system of claim 7, wherein the axial distance between the image-side surface of the fifth lens element and the image surface is BL, the axial distance between the fourth lens element and the fifth lens element is T45, a curvature radius of the object-side surface of the fifth lens element is R9, a curvature radius of the image-side surface of the fifth lens element is R10, and the following conditions are satisfied:

$0.20<BL/T45<0.80$; and $(R9-R10)/(R9+R10)<0$.

9. The photographing optical system of claim 7, wherein the central thickness of the second lens element is CT2, the central thickness of the third lens element is CT3, the axial distance between the second lens element and the third lens element is T23, and the following condition is satisfied:

$1.6<(CT2+CT3)/T23<3.0$.

10. The photographing optical system of claim 7, wherein the axial distance between the object-side surface of the first lens element and the image-side surface of the fifth lens element is TD, the axial distance between the image-side surface of the fifth lens element and the image surface is BL, and the following condition is satisfied:

$6.5<TD/BL$.

11. The photographing optical system of claim 7, wherein a focal length of the photographing optical system is f, a curvature radius of the object-side surface of the fourth lens element is R7, the f-number of the photographing optical system is Fno, and the following conditions are satisfied:

$-1.80<f/R7$; and $1.40<Fno<2.40$.

12. The photographing optical system of claim 7, wherein an Abbe number of the second lens element is V2, an Abbe number of the third lens element is V3, and the following conditions are satisfied:

$10.0<V2<40.0$; and $10.0<V3<40.0$.

13. The photographing optical system of claim 7, wherein a central thickness of the first lens element is CT1, the central thickness of the second lens element is CT2, and the following condition is satisfied:

$2.5<CT1/CT2<15$.

14. The photographing optical system of claim 7, wherein the central thickness of the third lens element is CT3, a central thickness of the fourth lens element is CT4, and the following condition is satisfied:

$0.63<CT3/CT4<1.3$.

15. The photographing optical system of claim 7, wherein an axial distance between the object-side surface of the first lens element and the image surface is TL, a focal length of the photographing optical system is f, a maximum image height of the photographing optical system is ImgH, a maximum value among refractive indices of all lens elements of the photographing optical system is Nmax, and the following conditions are satisfied:

$0.90<TL/f<1.50$;

$0.80<TL/ImgH<1.50$; and $1.65<Nmax<1.70$.

16. The photographing optical system of claim 7, wherein the first lens element has positive refractive power, the object-side surface of the first lens element is convex in an on-axis region thereof, the image-side surface of the second lens element is concave in an on-axis region thereof, the focal length of the first lens element is f1, a focal length of the second lens element is f2, and the following condition is satisfied:

$-0.51 \leq f1/f2 < -0.15$.

17. The photographing optical system of claim 7, wherein the fourth lens element has positive refractive power, the image-side surface of the fourth lens element is convex in an on-axis region thereof, the image-side surface of the fifth lens element is concave in an on-axis region thereof, a focal length of the fourth lens element is f4, the focal length of the fifth lens element is f5, and the following condition is satisfied:

$-3.50<f4/f5<-1.50$.

18. An image capturing unit, comprising:
the photographing optical system of claim 7; and
an image sensor disposed on the image surface of the photographing optical system.

19. The image capturing of claim 18, further comprising a barrel, wherein the photographing optical system is disposed in the barrel, the barrel has an object-side opening having a circular structure, and an image side of the barrel has a rectangular structure.

20. An electronic device, comprising:
the image capturing unit of claim 18.

21. A photographing optical system comprising five lens elements, the five lens elements being, in order from an object side to an image side, a first lens element, a second lens element, a third lens element, a fourth lens element and a fifth lens element, and each of the five lens elements having an object-side surface facing toward the object side and an image-side surface facing toward the image side;
wherein the second lens element has negative refractive power, the fifth lens element has negative refractive power, and at least one of the five lens elements has at least one aspheric surface having at least one inflection point;
wherein an axial distance between the image-side surface of the fifth lens element and an image surface is BL, an axial distance between the second lens element and the third lens element is T23, an axial distance between the fourth lens element and the fifth lens element is T45, a central thickness of the second lens element is CT2, a central thickness of the third lens element is CT3, an axial distance between the object-side surface of the first lens element and the image-side surface of the fifth lens element is TD, a focal length of the photographing optical system is f, a focal length of the third lens element is f3, a focal length of the fifth lens element is f5, a curvature radius of the object-side surface of the fourth lens element is R7, and the following conditions are satisfied:

$BL/T45<1.0$;

$0.65<(CT2+CT3)/T23<5.8$;

$7.0<TD/BL$;

$6.3<|f3/f5|$; and $-1.00<f/R7<1.40$.

22. The photographing optical system of claim 21, wherein the axial distance between the image-side surface of the fifth lens element and the image surface is BL, the axial distance between the second lens element and the third lens element is T23, the axial distance between the fourth lens element and the fifth lens element is T45, the central thickness of the second lens element is CT2, the central thickness of the third lens element is CT3, and the following conditions are satisfied:

$0.20<BL/T45<0.80$; and $1.6<(CT2+CT3)/T23<3.0$.

23. The photographing optical system of claim 21, wherein the axial distance between the second lens element and the third lens element is T23, the central thickness of the third lens element is CT3, and the following condition is satisfied:

$0.45<T23/CT3<1.0$.

24. The photographing optical system of claim 21, wherein the axial distance between the fourth lens element and the fifth lens element is T45, a central thickness of the first lens element is CT1, and the following condition is satisfied:

$1.10<T45/CT1<3.30$.

25. The photographing optical system of claim 21, wherein the first lens element has positive refractive power, the object-side surface of the first lens element is convex in an on-axis region thereof, the image-side surface of the second lens element is concave in an on-axis region thereof, a focal length of the first lens element is f1, a focal length of the second lens element is f2, and the following condition is satisfied:

$-0.51<f1/f2<-0.15$.

26. The photographing optical system of claim 21, wherein the image-side surface of the fourth lens element is convex in an on-axis region thereof, the image-side surface of the fifth lens element is concave in an on-axis region thereof, and the image-side surface of the fifth lens element is aspheric and has at least one inflection point.

27. The photographing optical system of claim 21, wherein the first lens element has positive refractive power, the fourth lens element has positive refractive power, the object-side surface of the fifth lens element is aspheric and has at least one inflection point, and the object-side surface of the fifth lens element has at least one critical point in an off-axis region thereof.

* * * * *